United States Patent
Hazlewood et al.

(10) Patent No.: US 9,715,865 B1
(45) Date of Patent: Jul. 25, 2017

(54) FORMING A REPRESENTATION OF AN ITEM WITH LIGHT

(71) Applicant: Amazon Technologies, Inc., Seattle, WA (US)

(72) Inventors: William R. Hazlewood, Seattle, WA (US); Jenny Ann Blackburn, Seattle, WA (US); Janet Ellen Galore, Seattle, WA (US); Timothy Andrew Ong, Sammamish, WA (US); Gonzalo Alberto Ramos, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 144 days.

(21) Appl. No.: 14/498,936

(22) Filed: Sep. 26, 2014

(51) Int. Cl.
*G09G 5/00* (2006.01)
*G09G 5/373* (2006.01)
(Continued)

(52) U.S. Cl.
CPC ............ *G09G 5/373* (2013.01); *G01B 11/02* (2013.01); *G06Q 30/0623* (2013.01);
(Continued)

(58) Field of Classification Search
CPC .... G09G 5/391; G09G 5/14; G09G 2340/125; G09G 5/395; G09G 5/373;
(Continued)

(56) References Cited

U.S. PATENT DOCUMENTS 6,018,403 A * 1/2000 Shirakura ............ G03H 1/0408
359/23
6,765,569 B2 * 7/2004 Neumann .............. G06T 7/0046
345/419
(Continued)

FOREIGN PATENT DOCUMENTS

JP 2008033302 A * 2/2008 ............. G03B 21/10

OTHER PUBLICATIONS

Hard disk laser scanner at ILDA 4K. [online]. Scanlime.org, Jul. 2008 [retrieved on Jul. 31, 2014]. Retrieved from the Internet: <URL: http://scanlime.org/2008/07/hard-disk-laser-scanner-at-ilda-4k/>, 5 pages.

*Primary Examiner* — Abderrahim Merouan
(74) *Attorney, Agent, or Firm* — Kilpatrick Townsend & Stockton LLP

(57) ABSTRACT

A projection equipped computing device is described that projects an accurate representation of an item available for purchase from an electronic marketplace onto a projection surface. For example, the device may identify physical dimensions of an item from an image of the item. The device may then determine the distance between it and the projection surface and project a light beam toward the projection surface to form a representation of the item on the projection surface. The representation of the item formed on projection surface has representative dimensions that mimic, at the determined distance, the physical dimensions of the item as identified from the image of the item. Accordingly, the user of the device can envision how the item would appear in a space located relative to the projection surface if the user purchased the item from the electronic marketplace and placed the item in that space.

21 Claims, 17 Drawing Sheets

(51) Int. Cl.
*G06Q 30/06* (2012.01)
*G01B 11/02* (2006.01)
*G06T 3/40* (2006.01)
*G09G 5/391* (2006.01)
*G09G 5/14* (2006.01)
*G09G 5/395* (2006.01)

(52) U.S. Cl.
CPC .............. *G06T 3/4007* (2013.01); *G09G 5/14* (2013.01); *G09G 5/391* (2013.01); *G09G 5/395* (2013.01); *G09G 2340/04* (2013.01); *G09G 2340/14* (2013.01)

(58) Field of Classification Search
CPC ............ G09G 2340/04; G09G 2340/14; G06T 3/4007; G01B 11/02; G06Q 30/0623
See application file for complete search history.

(56) References Cited

U.S. PATENT DOCUMENTS

| | | | | |
|---|---|---|---|---|
| 6,912,293 B1* | 6/2005 | Korobkin | ................ | G06T 17/10 345/420 |
| 7,502,160 B2* | 3/2009 | Aksyuk | ............. | G02B 26/0833 359/290 |
| 8,797,327 B2 | 8/2014 | Finn et al. | | |
| 8,902,227 B2* | 12/2014 | Harrison | ............... | G06T 19/006 345/420 |
| 9,158,375 B2* | 10/2015 | Maizels | ............ | G06T 19/006 |
| 9,160,993 B1* | 10/2015 | Lish | ................... | H04N 5/23229 |
| 9,165,405 B2* | 10/2015 | Meier | ..................... | G06T 15/20 |
| 9,245,193 B2* | 1/2016 | Kulkarni | ........... | G06K 9/00671 |
| 2001/0044858 A1* | 11/2001 | Rekimoto | ............... | G06F 3/011 710/1 |
| 2002/0105623 A1* | 8/2002 | Pinhanez | ............... | G03B 21/28 353/69 |
| 2006/0267858 A1* | 11/2006 | Yun | ................... | G02B 26/0808 345/1.1 |
| 2007/0081168 A1* | 4/2007 | Johnston | ............. | A61B 5/0084 356/614 |
| 2007/0097335 A1* | 5/2007 | Dvorkis | ............... | H04N 9/3129 353/94 |
| 2007/0143082 A1* | 6/2007 | Degnan | .................. | G06T 11/60 703/1 |
| 2008/0279453 A1* | 11/2008 | Candelore | .............. | G03B 21/26 382/176 |
| 2008/0284920 A1* | 11/2008 | Facius | .................. | H04N 9/3129 348/751 |
| 2009/0046140 A1* | 2/2009 | Lashmet | ............... | G09G 3/002 348/51 |
| 2009/0109240 A1* | 4/2009 | Englert | ................. | G06T 19/006 345/633 |
| 2009/0244097 A1* | 10/2009 | Estevez | ................. | G06F 1/1613 345/633 |
| 2010/0085621 A1* | 4/2010 | Shih | ..................... | G02B 26/105 359/206.1 |
| 2011/0058109 A1* | 3/2011 | Nishigaki | ............. | G06F 3/0425 348/744 |
| 2011/0109948 A1* | 5/2011 | Cable | ................... | G03H 1/0808 359/9 |
| 2011/0154233 A1* | 6/2011 | Lamarca | ............... | G06F 3/0425 715/764 |
| 2012/0219228 A1* | 8/2012 | Osako | .................. | G06K 9/3275 382/199 |
| 2013/0106910 A1* | 5/2013 | Sacco | .................. | G06T 19/006 345/633 |
| 2013/0342564 A1* | 12/2013 | Kinnebrew | ............ | G09G 3/003 345/619 |
| 2014/0168277 A1* | 6/2014 | Ashley | .................. | G06F 3/1446 345/672 |
| 2014/0232736 A1* | 8/2014 | Abele | .................... | B60K 35/00 345/589 |
| 2014/0267228 A1* | 9/2014 | Ofek | .................... | G06T 19/006 345/419 |
| 2015/0029223 A1* | 1/2015 | Kaino | ................... | G06T 19/006 345/633 |
| 2015/0145887 A1* | 5/2015 | Forutanpour | ........... | G06F 3/017 345/633 |
| 2016/0093107 A1* | 3/2016 | Yamamoto | .............. | A63F 13/92 345/633 |
| 2016/0147408 A1* | 5/2016 | Bevis | ................... | G06F 3/04815 715/850 |

* cited by examiner

FORMING A REPRESENTATION OF AN ITEM WITH LIGHT

BACKGROUND

Various items (e.g., goods and/or services) may be found by users browsing network pages of a retail website or other electronic marketplace. For example, a user interested in ordering a television may browse network pages related to televisions that are generated by the retail website. A merchant that offers the television for sale may provide an image of the television and its dimensions to be included in a network page related to the television. However, even when provided an image of the television, the user is often left to imagine how the television might look in his or her home or how the television will look in a particular area. In some instances, the user may physically measure the area with a tape measure and estimate if the dimensions of the item will fit the space. However, the process of doing so can be cumbersome and inaccurate. When the item arrives, the user's imagination and/or estimate may be inaccurate or otherwise problematic, forcing the user to return the item and potentially browse through additional items and network pages for a replacement.

BRIEF DESCRIPTION OF THE DRAWINGS

Various embodiments in accordance with the present disclosure will be described with reference to the drawings, in which.

DETAILED DESCRIPTION

Figure 1:
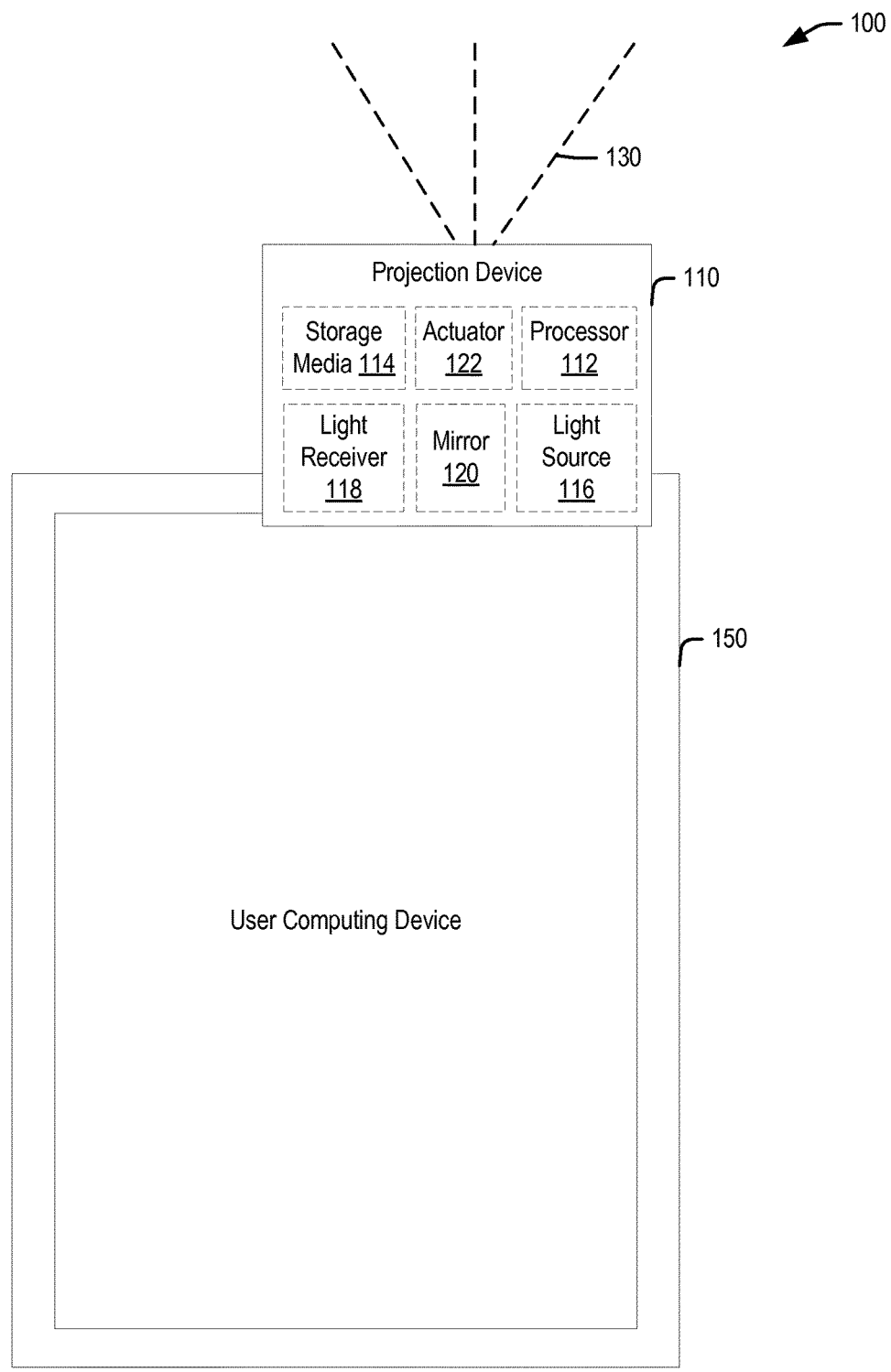
FIG. 1 is a block diagram illustrating an example projection equipped computing device for projecting representative dimensions of an item available from an electronic marketplace onto a projection surface.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a system for projecting representative dimensions of an item available from an electronic marketplace onto a projection surface. For example, a computing device may identify physical dimensions of an item from image data for the item available from the electronic marketplace and determine or measure the distance between a location of the computing device and a projection surface. In one embodiment, the computing device identifies the proper size of the item (e.g., using the representative dimensions of the item). These representative dimensions of the item identify the proper size of the item as it should be perceived by a user when a representation of the item is projected onto the projection surface at the measured distance. This may help ensure that, once a representation of the item is projected onto the projection surface with the representative dimensions, the representative dimensions of the item mimic the actual, physical dimensions of the item as identified by or from the image data. For clarity, the terms "measured distance" or "determined distance" (used interchangeably) are often used in this description to refer to the physical distance between the computing device projecting the representation of the item and the projection surface. However, as will be apparent to one of skill in the art, a suitable proxy may be used in place of an explicitly measured, physical distance, such as a reflected signal delay (e.g., delay between pulse generation and reflected pulse detection) and/or interferometry techniques. Accordingly, the terms "measured distance" or "determined distance" may also reference such proxies.

In one embodiment, a user can operate a user computing device (e.g., a laptop, tablet, smartphone, electronic reader, wearable computing device, game controller or console, etc.) or other computing device to browse an electronic marketplace for an item (e.g., a vase) of interest. For example, the user may browse the electronic marketplace and locate a vase that the user believes may be appropriate for his or her living room. However, it may not be readily apparent to the user from any images of the vase available from the electronic marketplace, how the vase would look or fit in a space of the user's living room in which the user is interested in placing the vase. Thus, using a projection computing device (hereinafter "projection device") described herein that may be coupled to the user computing device (or integrated with the user computing device in some embodiments), the user may project a representation of the vase onto a projection surface located in the space to help the user visualize how the vase will look or fit in that space. For purposes of description herein, the user computing device having a projection device communicatively and/or physically coupled thereto, or integrated therein, may be referred to a "projection equipped computing device."

Returning to the vase example, the user can select, from a network page describing the item (referred to herein as an "item detail page") and generated by the electronic marketplace, an option to "Try in My Space." In response, the electronic marketplace may provide the physical dimensions for the vase to the projection equipped computing device. In addition, the user may utilize the projection equipped computing device to measure a distance between a location of the projection equipped computing device and a projection surface onto which the user wants to project the representation of the image (e.g., a wall behind a desk upon which the user wants to place the vase or the desktop itself). Using the physical dimensions provided by the electronic marketplace, and the measured distance obtained by the projection equipped computing device, the projection equipped computing device can determine how to project a light beam toward the projection surface in order to form a representation of the vase on the projection surface, so that the representative dimensions of the vase projected onto the projection surface mimic the physical dimensions or actual size of the vase as they would be perceived by the user from the measured distance. Thus, the user may be able to visualize, based on the representation (and optionally other information), how the vase may look and/or whether the vase will fit in the space desired by the user.

Comparatively, when the measured distance between the projection surface and the location of the projection equipped computing device is not obtained, the representation of the item projected onto the projection surface may be larger or smaller than the item's actual size. Accordingly, without use of the measured distance, the representation of the item can appear larger than the physical dimensions of the item when the projection device (and/or the projection equipped computing device) is moved farther away from the projection surface. Thus, the representative dimensions of the representation of the item may not mimic the physical dimensions of the item as they would be perceived by the user from the measured distance and may prevent the user from visualizing the actual, physical size of the item in the space desired by the user.

In another illustrative example, a user can operate a projection equipped computing device to order a pair of high-heeled shoes, hockey gear, or jewelry (e.g., "wearable items") from an electronic marketplace. Before placing an order for a wearable item, the user can select an option from a network page generated by the electronic marketplace and display the item to "try on the item." In response, the electronic marketplace can return physical dimensions of the wearable item to the projection equipped computing device. The projection equipped computing device may also measure a distance between a location of the projection equipped computing device and a projection surface (e.g., a user's neck where they will wear the necklace, or a wall where the height of the high heels will be projected, etc.). The projection equipped computing device can then determine how to project a light beam toward the projection surface in order to form a representation of a wearable item, so that the representative dimensions of the wearable item at the projection surface mimic the physical dimensions of the wearable item identified from, e.g., image data for the wearable item. Thus, the user may be able to determine, based on the projected representation (or other information), whether the wearable item is the appropriate size.

In yet another illustrative example, a user can operate a projection equipped computing device to read an electronic book (e.g., about elephants). When the user accesses a portion of the electronic book that discusses the physical characteristics of an elephant's ear (or other item), the user can select an option provided by the electronic book to "Show this Item." The identification of the item (e.g., the elephant's ear) can correspond with physical dimensions of the item (e.g., a data store associated with the electronic book can include the physical dimensions of the elephant's ear as metadata associated with a word and/or location in the electronic book, and the projection equipped computing device can access these physical dimensions when the data is requested through the option provided by the electronic book). The projection equipped computing device may also measure a distance between a location of the projection equipped computing device and a projection surface (e.g., a wall upon which an image of the elephant's ear is to be projected, etc.). The projection equipped computing device can determine how to project a light beam toward the wall in order to form a representation of the elephant's ear, so that the representative dimensions of the elephant's ear at the wall mimic the physical dimensions of the elephant's ear referenced in or associated with the electronic book. Thus, the user may be able to visualize the scale of the elephant's ear based on the representation of the ear projected on the wall.

An item can include any item having physical dimensions that is available from an electronic marketplace or other network site, or any item referenced on a network page (e.g., an item detail page or order checkout page) or in any other form of digital content (e.g., an electronic book, an electronic document, etc.). The item may be associated with physical dimensions (e.g., length, width, height, etc.), item properties (e.g., colors, sizes, etc.), a provider or seller that offers the item for sale or other acquisition, a location in an electronic book or an audiobook, a network page, and the like.

A representation of the item can include an outline, silhouette, hologram, or plasma projection that visually forms an item in space, or other visual depiction of the item. The representation can include a single color or multiple colors of the item, including an outline of the item in one color or line style (e.g., a solid line), and some interior identification of the item in a different color or line style (e.g., dashed, dotted, etc.). In some examples, the representation of the item is a box (or circle or some other generic shape) that can generally represent the item without any finer details, such as the item's exact shape or surface features.

Image data can include any information about or describing an item. For example, image data may include graphical information such as a photograph, a two-dimensional representation of the item, a three-dimensional representation of the item, an outline of the item, image of the item, or a box that represents a generic shape of the item. In some examples, image data may include textual information, including values (e.g., physical dimensions, representative dimensions, absolute values of the edges of a representation of an item around a center point, features of the item relative to other features including the distance between two corners of a television screen or the physical dimension between a head and a shoulder of a stuffed animal, etc.), a description of the item, an item identifier, and the like.

A projection surface can include a physical surface upon which the representation of the item can be projected. For example, the projection surface can include a wall, corner, top of a cabinet, desk, table, body part of a user, or any other surface where an actual item may be placed or viewed (e.g., after the item is ordered and received or upon request). In some examples, the projection surface may be an intermediary projection surface (e.g., a projection surface that is reflective, so that the representation of the item is formed at a secondary projection surface).

A dimensional profile can include physical or representative dimension information about an item that can be stored for future use. For example, image data may identify that a model A100 television by Acme Co. is 3-feet tall by 5-feet wide, with a stand that is 1-foot tall by 1-foot wide. The dimensional profile may include each of these physical dimensions. The dimensional profile may be used to create a two-dimensional representation of the item (e.g., just the height and width) or a three-dimensional representation of item (e.g., depth, height, and width, or measurements in various planes, etc.). In some examples, a dimensional profile converts the physical dimensions to representative dimensions (e.g., using a 1-to-1 ratio, by calculating the representative dimensions for a particular surface from the physical dimensions, etc.).

FIG. 1 illustrates a projection equipped computing device 100 for projecting accurate, representative dimensions of an item on a projection surface, according to at least one example. For example, the projection equipped computing device 100 may include one or more components used to find an item, identify image data, and project a representation of the item onto a projection surface, including a projection device 110 and a user computing device 150. In some examples, the projection device 110 and user computing device 150 may be the same device (not shown) and/or the aspects of the projection device 110 may be incorporated with the user computing device 150. In some examples, components of the projection device 110 may be built into the user computing device 150.

In some examples, the projection device 110 may be physically coupled to the user computing device 150. For example, the projection device 110 may be physically coupled to the user computing device 150 by plugging the projection device 110 into, or snapping the projection device 110 to, the user computing device 150 via a USB (universal serial bus) connector or other connector or interface enabling communication and power supply between the devices. In another example, the projection device 110 may be communicatively coupled to the user computing device 150 via a wired or wireless connection. Such connections may be long range (e.g., via a wired or wireless network) or short range (e.g., via a cable or via wireless USB or Bluetooth devices). When the projection device 110 and the user computing device 150 are the same computing device, aspects of the projection device 110 (e.g., light source, light receiver, etc.) can be built into the user computing device 150 to form a single, integrated device as a projection equipped computing device 100.

In some examples, the projection device 110 may include a processor 112, storage media 114, a light source 116, a light receiver 118, mirror 120, and an actuator 122. The processor 112, storage media 114, and user computing device 150 are explained in more detail below in connection with FIG. 2.

The light source 116 can produce a light beam 130 that emanates from the projection device 110 toward a projection surface external to the projection device 110 (e.g., a wall, a mirror, a body part, a desktop, a floor, etc.). In some embodiments, the light beam is similar to that produced by a laser pointer. In some examples, the light beam 130 may be a phosphide green laser, or other type of laser beam known in the art. In such embodiments, the light source 116 may include a laser diode. In yet other embodiments, the light source 116 may include two-dimensional (2D) or three-dimensional (3D) laser projection elements so as to produce a 2D or 3D representation of an item, including a hologram of the item.

In some examples, the light source 116 may also produce a light beam that is internal to the projection device 110. For example, the light source may direct the light beam at the mirror 120 so that the mirror can reflect the light beam toward a projection surface.

The light receiver 118 can receive light that is provided by the light source 116. For example, after the light beam 130 provided by the light source 116 is projected toward a projection surface, the reflection of the light beam 130 can be received at the light receiver 118. The light receiver 118 and/or processor 112 can determine a characteristic of the reflection. Characteristics may include the distance between the projection device 110 and projection surface, a measuring plane, an angle to project the representation of the item to the projection surface, or other information.

In some examples, the projection device 110 can implement the light receiver 118 as a distance sensor. The distance sensor can provide the distance between the projection device 110 and the projection surface to the processor 112 (e.g., through distal sensing). In some examples, the distance sensor can be implemented instead of the actuator 122 and/or light receiver 118.

The mirror 120 can be operable to direct light toward a projection surface. The mirror may be coupled with an axis, hinge, or driver (not shown). In some examples, the mirror 120 can include a MicroElectroMechanical Systems (MEMS) mirror. The mirror 120 may be implemented in a quasi-static mode that can repeat an operation (e.g., rapidly direct the light beam to 6-degrees to form a dot of light at the projection surface for a millisecond, followed by a second dot of light directed at the projection surface at 5.5-degrees for a millisecond, etc.). Control of the mirror may be conducted through a low current analog voltage input or other energy source.

In some examples, a mirror 120 may not be implemented at the projection device 110. Instead, the projection device 110 may project a light beam directed on the projection surface to form a single representation of the item, rather than a rapidly reflected light beam to form the representation. For example, the projector may project an outline, image, or hologram of the item instead of a burst of light that rapidly moves to form an outline or image.

In an illustrative example, once the light source 116 projects the light beam toward the mirror 120, the varying angles of the mirror at different times can produce light at different points around the projection surface. The light beam 130 can form the representation of the item with the appropriate, representative dimensions for the calculated distance. In some examples, the light beam can be projected so quickly, that the points of the light form a substantially static representation of the item to the user's eye. In some examples, the light beam can be turned on and off so quickly that the representation appears to create a persistent image of the item.

In some examples, the mirror 120 may move rapidly when the distance between the projection surface and the projection equipped computing device 100 is small, whereas the mirror may move less frequently when the distance between the projection surface and the projection equipped computing device 100 is larger. In some examples, the representation of the item subtends the angle of the mirror, so that the angle of the mirror is larger when the projection equipped computing device 100 is closer to the projection surface, than when the projection equipped computing device 100 is farther from the projection surface.

In some examples, the projection surface may be an intermediary projection surface and the determined distance is associated with the distance between the intermediary projection surface and the projection equipped computing device 100. For example, the intermediary projection surface may be reflective, so that the light may reflect from the intermediary projection surface and form the representation of the item at a secondary projection surface (e.g., the actual surface where the user would like to place the item). As an example illustration, if the user is interested in a vase that will be placed on a table in the middle of a room, e.g., on a coffee table or on a dining room table where there is not a close wall or other surface to project the item, the user can place a reflective surface (e.g., a poster board, mirror, paper, etc.) at the desired location for item and project the representation of the item onto the intermediary projection surface. In some examples, the determined distance between the projection device and the projection surface may correspond with the intermediary projection surface (e.g., a single measurement) or the secondary projection surface (e.g., one or two measurements).

The actuator 122 (and/or processor 112) can move or control of the light source 116, light receiver 118, or mirror 120. In some examples, the actuator 122 can be used to project the light beam at a first time and a second time. For example, the actuator 122 may instruct the light source to provide a light beam toward the mirror 120 and, once the light beam is projected toward the mirror, instruct the mirror to adjust to a different angle. The actuator 122 may help the light beam form a pulse-based (e.g., light provided in an on/off succession) or continuous projection of light at the projection surface, forming a representation of the item at the projection surface. In some examples, the pulse-based projection of light may be projected at multiple times, including at the first time and the second time. In some examples, the first time and second time may be milliseconds apart, and may appear to the human eye to form a continuous projection of light.

In some examples, the projection device 110 can be a projector and include projection mapping and keystone correction. For example, when the projection is at an angle to the projection surface, a projected "box" may appear to be a "trapezoid." The keystone correction may calculate the adjustments in the representative dimensions so that the projected image looks like the appropriate shape (e.g., the box). In some examples, the projection device 110 may include a distance sensor and/or a depth sensor, in part to evaluate the projection surface and warp the representation of the item to project correctly on the projection surface, e.g., when the projection surface is not flat, but rather is curved or angled.

When the projection device 110 and user computing device 150 are coupled, the projection device 110 may use functionality from the user computing device 150 to help form the representation of the item at the projection surface. For example, the user computing device 150 may include a digital camera with a flash that is capable of sensing distance and/or light. Thus, the projection device 110 may not need to implement or operate one or more sensors that would duplicate this function. In another example, the user computing device 150 itself may include projection components, including a micro-projector, liquid-crystal display (LCD) projector, laser light projector (e.g., with autofocus), a computing device with MEMs mirrors and/or vibrating mirrors, laser pointer, a computing device that provides vector imaging of items, and the like.

The projection device 110 may include a processor 112, a light source 116 for projecting a light beam toward a projection surface, and one or more computer-readable non-transitory storage media collectively storing computer-executable instructions that, when executed by the processor, configure the projection device 110 to collectively perform operations. The operations may comprise identifying physical dimensions of an item from image data, determining or measuring a distance between the apparatus and a projection surface, and based at least in part on the measured distance, projecting a light beam toward the projection surface from the light source 116. The projected light beam can form a representation of the item on the projection surface using representative dimensions. The representative dimensions of the representation of the item on the projection surface can mimic the physical dimensions of the item identified by the image data.

In some examples, the projection device 110 may also comprise a light receiver 118. The operations can further comprise projecting, by the light source 116, the light beam towards the projection surface at least in part to measure the distance between the projection equipped computing device and the projection surface. A reflection of the light beam may be received by the light receiver 118. At least one characteristic of the reflection may be determined. In some examples, the projection device 110 may also comprise a mirror 120. Thus, the operations can further comprise projecting the light beam toward the mirror. The mirror 120 may be operable to direct the light beam toward the projection surface at a determined angle.

Figure 2:
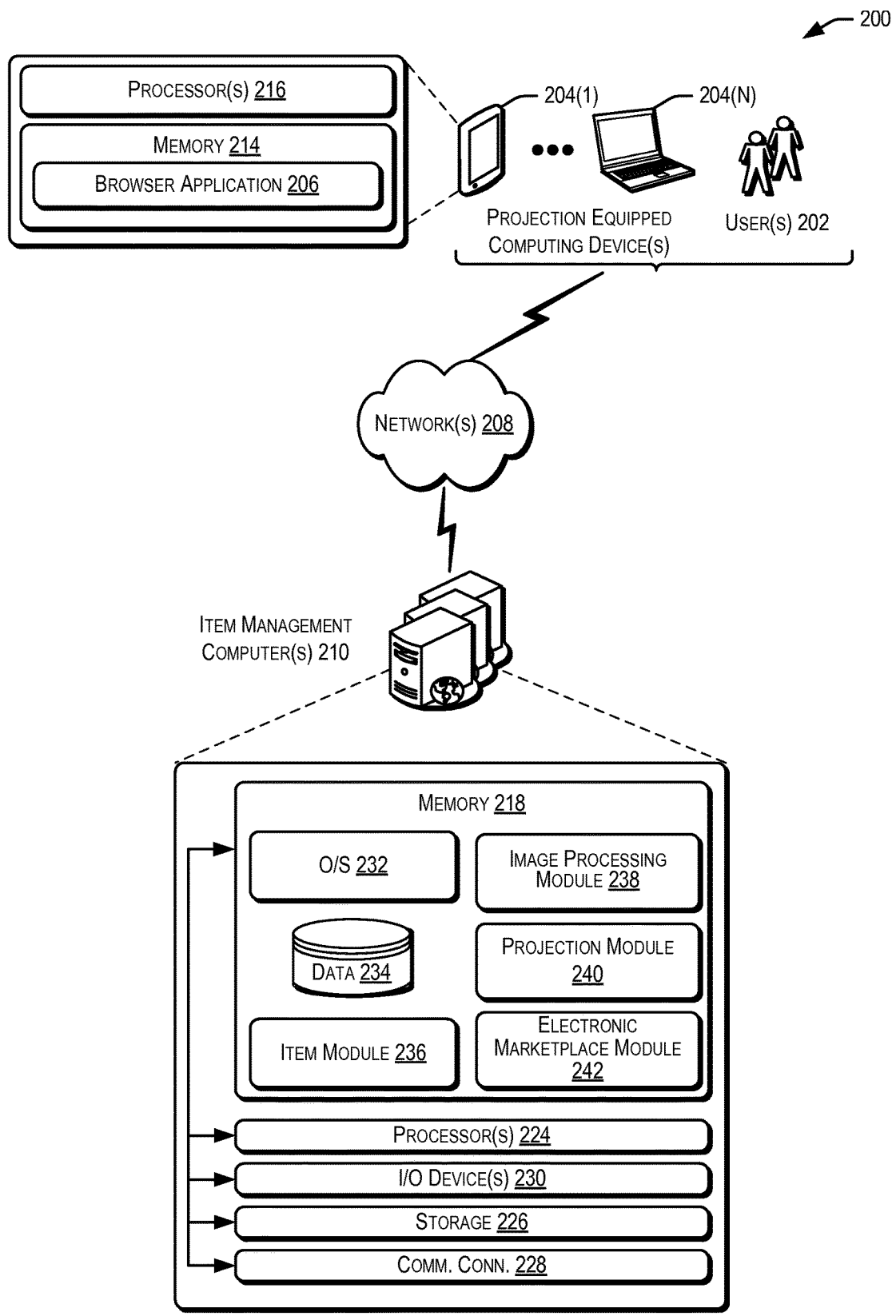
FIG. 2 is a block diagram illustrating an example operating environment in which the projection equipped computing device of FIG. 1 may be used in conjunction with an item management computer and/or a user device to project representative dimensions of an item available from an electronic marketplace onto a projection surface.

FIG. 2 illustrates an example operating environment 200 in which projection equipped computing devices 204 may be used in conjunction with an item management computer 210 to project representative dimensions of an item available from an electronic marketplace onto a projection surface. In environment 200, one or more users 202 may utilize respective projection equipped computing devices 204(1)-(N) (collectively, projection equipped computing devices 204) to access an application 206 (e.g., a browser), via one or more networks 208. In some examples, at least one user computing device is in wired or wireless communication with a projection device, such as projection device 110 and/or user computing device 150 as illustrated in FIG. 1. However, in yet other examples, at least one of the projection equipped computing devices 204 is a user computing device (such as user computing device 150 illustrated in FIG. 1) including an integrated projection device, or is a user computing device physically coupled to a projection computing device 110 as illustrated in FIG. 1.

In some aspects, the application 206 may be hosted, managed, and/or provided by a computing resources service or service provider, such as by utilizing one or more service provider computers and/or one or more item management computers 210. The one or more item management computers 210 may, in some examples, provide computing resources such as, but not limited to, client entities, low latency data storage, durable data storage, data access, management, virtualization, hosted computing system or "cloud-based" computing solutions, electronic content performance management, etc. The one or more item management computers 210 may also be operable to provide web hosting, computer application development, and/or implementation platforms, combinations of the foregoing, or the like to the one or more users 202.

The one or more item management computers 210, in some examples, may identify physical dimensions of an item, determine a distance between a projection device and a projection surface, and instruct the projection device to project a light beam onto the projection surface to form a representation of the item with representative dimensions. The representative dimensions may correspond with the physical dimensions. In some examples, aspects of the one or more item management computers 210 may be implemented by projection equipped computing devices 204, so that the projection equipped computing devices 204 determine the distance between the projection equipped computing device and the projection surface, independent of contacting a remote computing system. In some examples, the item management computers 210 may be implemented at the projection equipped computing devices 204 (not shown).

In some examples, the network(s) 208 be any wired network, wireless network, or combination thereof. In addition, the network 208 may be a personal area network, local area network, wide area network, cable network, satellite network, cellular telephone network, or combination thereof. In addition, the network 208 may be an over-the-air broadcast network (e.g., for radio or television) or a publicly accessible network of linked networks, possibly operated by various distinct parties, such as the Internet. In some embodiments, the network 208 may be a private or semi-private network, such as a corporate or university intranet. The network 208 may include one or more wireless networks, such as a Global System for Mobile Communications (GSM) network, a Code Division Multiple Access (CDMA) network, a Long Term Evolution (LTE) network, or any other type of wireless network. The network 208 can use protocols and components for communicating via the Internet or any of the other aforementioned types of networks, such as the Hypertext Transfer Protocol ("HTTP"). Protocols and components for communicating via the Internet or any of the other aforementioned types of communication networks are well known to those skilled in the art of computer communications and thus, need not be described in more detail herein. While the illustrated example represents the users 202 accessing the application 206 over the networks 208, the described techniques may equally apply in instances where the users 202 interact with the item management computers 210 via the one or more projection equipped computing devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

As described briefly above, the application 206 may allow the users 202 to interact with a service provider computer, such as to access network content (e.g., network pages, music, video, etc.). The one or more item management computers 210, perhaps arranged in a cluster of servers or as a server farm, may host the application 206 and/or hosted computing system or "cloud-based" services. Other server architectures may also be used to host the application 206. The application 206 may be capable of handling requests from many users 202 and serving, in response, various network pages described items (e.g., goods and/or services) that may be available for purchase or other acquisition. The application 206 can provide any type of network site that supports user interaction, including social networking sites, network-based retailers, informational sites, blog sites, search engine sites, news and entertainment sites, and so forth. As discussed above, the described techniques can similarly be implemented outside of the application 206, such as with other applications running on the projection equipped computing devices 204.

The projection equipped computing devices 204 may include any type of user computing device such as, but not limited to, a mobile phone, a smart phone, a personal digital assistant (PDA), a laptop computer, a wearable computing device, a desktop computer, a thin-client device, a tablet PC, an electronic book (e-book) reader, etc. In some examples, the projection equipped computing devices 204 may be in communication with the item management computers 210 via the network(s) 208, or via other network connections. Additionally, the projection equipped computing devices 204 may be part of the distributed system managed by, controlled by, or otherwise part of the item management computers 210 (e.g., a console device integrated with the item management computers 210).

In one illustrative configuration, the projection equipped computing devices 204 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described when executed by the processor(s) 216 or other hardware. The projection equipped computing devices 204 may also include geo-location devices (e.g., a global positioning system (GPS) device or the like) for providing and/or recording geographic location information associated with the projection equipped computing devices 204.

The memory 214 may store program instructions that are loadable and executable on the processor(s) 216, as well as data generated during the execution of these programs. Depending on the configuration and type of projection equipped computing devices 204 (e.g., including the user computing device, projection device, etc.), the memory 214 may be volatile (such as random access memory (RAM)) and/or non-volatile (such as read-only memory (ROM), flash memory, etc.). The projection equipped computing devices 204 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the projection equipped computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein, such as via the browser application 206 or dedicated applications (e.g., smart phone applications, tablet applications, etc.). The browser application 206 may be configured to receive, store, and/or display a network site or other interface for interacting with the item management computers 210. Additionally, the memory 214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 202 provided response to a security question or a geographic location obtained by the projection equipped computing devices 204.

In some aspects, the item management computers 210 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the item management computers 210 may be in communication with the projection equipped computing devices 204 and/or other service providers via the networks 208, or via other network connections. The item management computers 210 may include one or more servers, perhaps arranged in a cluster, as a server farm, or as individual servers not associated with one another. These servers may be configured to implement the content performance management described herein as part of an integrated, distributed computing environment.

In one illustrative configuration, the item management computers 210 may include at least one memory 218 and one or more processing units (or processor(s)) 224. The processor(s) 224 may be implemented as appropriate in hardware or computer-executable instructions or firmware executed by hardware.

The memory 218 may store program instructions that are loadable and executable on the processor(s) 224, as well as data generated during the execution of these programs. Depending on the configuration and type of item management computers 210, the memory 218 may be volatile (such as RAM) and/or non-volatile (such as ROM, flash memory, etc.). The item management computers 210 or servers may also include additional storage 226, which may include removable storage and/or non-removable storage. The additional storage 226 may include, but is not limited to, magnetic storage, optical disks and/or tape storage. The disk drives and their associated non-transitory computer-readable media may provide non-volatile storage of computer-readable instructions, data structures, program modules, and other data for the computing devices. In some implementations, the memory 218 may include multiple different types of memory, such as SRAM, DRAM, or ROM.

The memory 218, the additional storage 226, both removable and non-removable, are all examples of non-transitory computer-readable storage media. For example, non-transitory computer-readable storage media may include volatile or non-volatile, removable or non-removable media implemented in any method or technology for storage of information such as computer-readable instructions, data structures, program modules, or other data. The memory 218 and the additional storage 226 are all examples of non-transitory computer storage media. Additional types of non-transitory computer storage media that may be present in the item management computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the item management computers 210. Combinations of any of the above should also be included within the scope of non-transitory computer-readable media.

The item management computers 210 may also contain communications connection(s) 228 that allow the item management computers 210 to communicate with a stored database, another computing device or server, user terminals and/or other devices on the network(s) 208. The item management computers 210 may also include I/O device(s) 230, such as a keyboard, a mouse, a pen, a voice input device, a touch input device, a display, speakers, a printer, etc.

Turning to the contents of the memory 218 in more detail, the memory 218 may include an operating system 232, one or more data stores 234, and/or one or more application programs or services for implementing the features disclosed herein including an item module 236, an image processing module 238, a projection module 240, and/or an electronic marketplace module 242. In some examples, the item module 236 may be configured to identify an item.

The item module 236 may also be configured to interact with the electronic marketplace module 242 to receive information from an electronic marketplace about the item for which a representation is to be projection on a projection surface. For example, the user can browse to a network page associated with the item. The network page may be provided through an electronic marketplace, where sellers provide items for purchase or other acquisition and may provide the same item at competing prices (or delivery times, or feedback ratings, etc.). The identifier associated with the item can be received in association with the network page and provided to one or more data stores 234 to receive additional information about the item.

The memory 218 may also include an image processing module 238. The image processing module 238 may be configured to determine information about the item. For example, image data may include graphical information including a photograph, two-dimensional representation of the item, three-dimensional representation of the item, a hologram of the item, an outline or edges of the item, image of the item, or a box that represents a generic shape of the item. In some examples, image data may include textual information, including values (e.g., physical dimensions, representative dimensions, absolute values of the edges of a representation of an item around a center point, features of the item relative to other features including the distance between two corners of a television screen or the physical dimension between a head and a shoulder of a stuffed animal, etc.), descriptions of the item, item identifiers, and the like.

Image data can be received from a variety of sources. For example, the image data may be received from a manufacturer, a seller, and/or an item manual that defines the aspects of the item. In some examples, one or more images of the item may be analyzed to generate the image data as well. For example, the image data can be generated using an edge detection algorithm, image recognition algorithm, and the like. In some examples, the image processing module 238 may be configured to implement a graphics algorithm to determine the representative dimensions of the item, which can help determine the appropriate tilt angles of the mirror (e.g., as illustrated in FIG. 1) of a projection equipped computing device.

The image processing module 238 may also be configured to determine a representation of the item and/or transmit the representation of the item to a projection equipped computing device. The representation may be based in part on the image data. For example, the image data can include a photograph or image of the item, and the representation of the item can include an outline of the item depicted in the image. In some examples, the representation of the item includes the front, sides, or base of the item. In some examples, the representative dimensions of the item formed at the projection surface can mimic the physical dimensions of the item identified by the image data.

The image processing module 238 may also be configured to choose a default representation of the item based in part on the amount of information the projection equipped computing device has. For example, when the image processing module 238 can reconstruct a detailed representation of the item, including front, side, base, etc. of the item, the image processing module 238 may be configured to provide a more detailed representation of the item. However, if less information is available, the representation of the item may include a box with appropriate representative dimensions, or simply a place holder representation (e.g., a box without appropriate representative dimensions).

The image processing module 238 may also be configured to identify the orientation of a photograph or image to help generate the image data. For example, the image processing module 238 may determine that the photograph or image of the item shows the front of the item, and another photograph or image of the item shows the side of the item. In some examples, the image processing module 238 may determine the orientation of a photograph or image by comparing the photograph or image to other stored images at the one or more data stores 234.

The image processing module 238 may also be configured to create a vector diagram as a representation of the item. For example, the representation of the item can include the motion, force, and/or movement of the item through use of a vector diagram.

The image processing module 238 may also be configured to generate a dimensional profile of the item. For example, the dimensional profile can include the physical dimensions of the item from image data or representative dimensions of the item determined from the physical dimensions. The dimensional profile can be stored with the one or more data stores 234 or within another electronic data store.

The image processing module 238 may also be configured to generate image data from an image. For example, the image processing module 238 may be configured to receive a photograph of the item and generate the image data from the photograph. In another example, the image processing module 238 may be configured to receive an image of the item and provide the image to a projection equipped computing device. The projection equipped computing device can utilize image recognition to process the image and generate the image data. The image data can also be received from the projection equipped computing device, via an image capturing device with which the projection equipped computing device is equipped.

The memory 218 may also include a projection module 240. The projection module 240 may be configured to instruct one or more of the projection equipped computing devices 204 to project the light beam toward the projection surface. The light beam may be a laser beam and/or include a laser beam as described above.

In some examples, the light beam can be projected toward a mirror associated with the projection equipped computing device. The mirror may be operable to direct the light beam toward the projection surface at a determined angle. The determined angle of the mirror may be adjusted based in part on the distance from the projection equipped computing device to the projection surface, and a light beam may be projected toward the mirror at the adjusted angle. In some examples, the representation of the item can subtend the angle of the mirror. For example, the angle of the mirror may be larger when the projection equipped computing device is closer to the projection surface, than when the projection equipped computing device is farther from the projection surface.

In some examples, one or more light beams may be projected by the projection equipped computing device at different times. For example, the projected light beam can be projected at a first time, the angle of the mirror can be adjusted, and the light beam can be projected at a second time. An actuator within the projection equipped computing device may be used to project the light beam at the first time and the second time. In some examples, projection of the light beam at the first time and the second time can help form a multi-dimensional representation of the item by the light beam.

The projection module 240 may also be configured to determine a distance between the projection equipped computing device and a projection surface. For example, a light beam may be projected from the projection equipped computing device at a projection surface to help measure the distance between the projection equipped computing device and projection surface. The light beam may be projected towards the projection surface. A reflection of the light beam may be received at the projection equipped computing device, and at least one characteristic of the reflection may be determined (e.g., the distance between the projection equipped computing device and projection surface) by the projection module 240.

The projection module 240 may also be configured to generate a notification. The notification may be projected and/or displayed by the projection equipped computing device. In some examples, the notification can identify whether the item will fit in a space associated with the projection surface. In another example, the notification can identify that the item as available to order from a seller or electronic marketplace.

The memory 218 may also include an electronic marketplace module 242. The electronic marketplace module 242 may be configured to offer an item to a user. For example, the user can browse through an electronic marketplace for an item to order. The user can select an option to order the item through the electronic marketplace. The electronic marketplace module 242 may also be configured to allow a user to search for an item with particular restrictions (e.g., physical dimensions). For example, the user may provide rules or criteria (e.g., identified by the user or by dimensional analysis of an item), other recommendations or feedback (e.g., other users claim that a 60-inch television is too big for a 90-inch space), budget, or other restrictions. One or more of these limitations may also limit or expand the scope of the search in providing relevant items to the user. The electronic marketplace module 242 may also be configured to interact with image data. For example, the image data can be obtained from a network page associated with the item and provided by an electronic marketplace.

Figure 3:
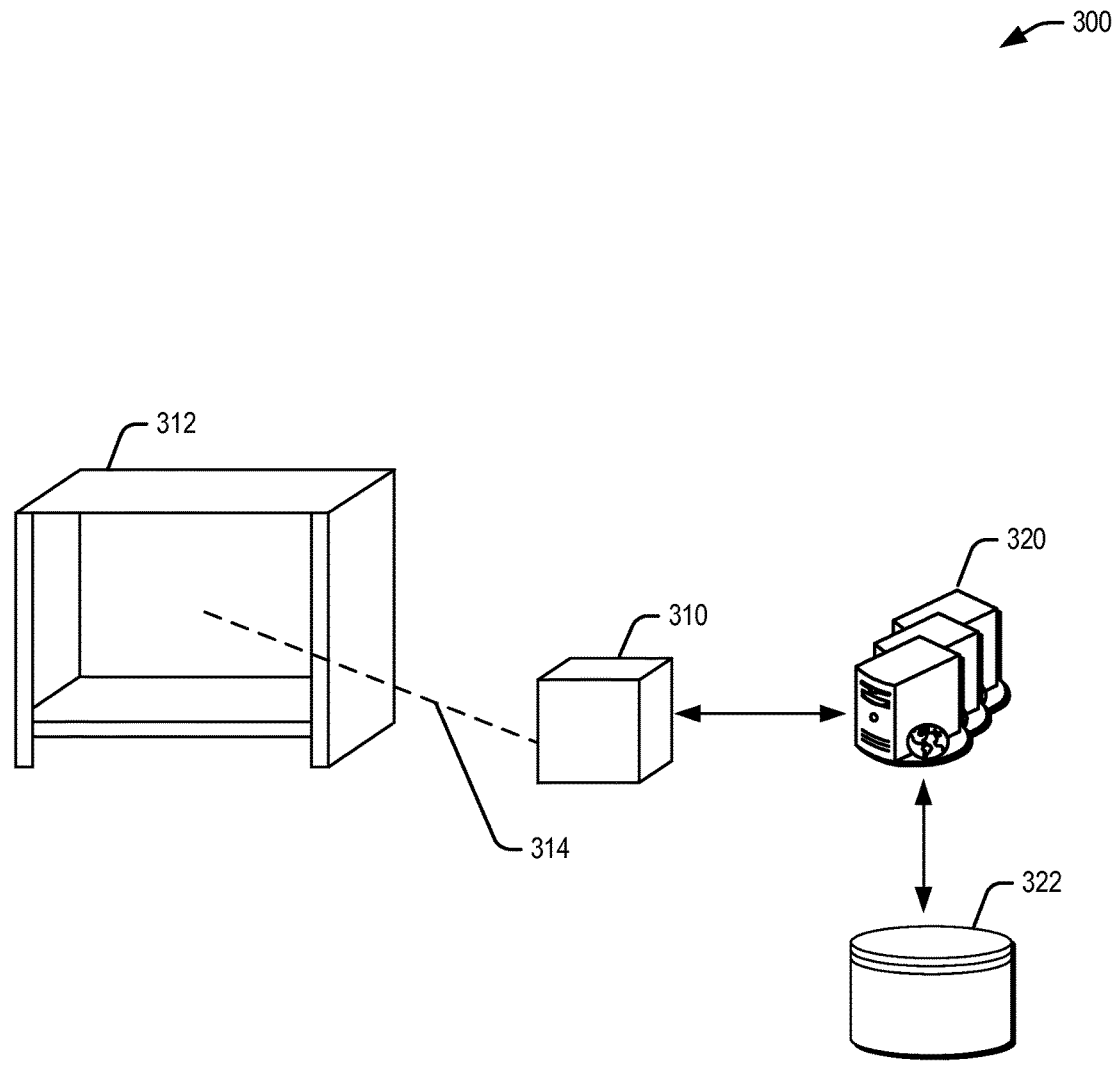
FIG. 3 is a pictorial diagram illustrating an example of determining or measuring a distance between the projection equipped computing device of FIG. 1 and a projection surface.

FIG. 3 is a pictorial diagram illustrating an example 300 of determining or measuring a distance between a projection equipped computing device and a projection surface. The illustrated example includes a projection equipped computing device 310 at a distance 314 from a projection surface 312, as well as an item management computer 320, and data store 322. In some examples, the projection equipped computing device 310 may include or be in communication with a projection device such as that shown in FIG. 1, the item management computer 320 may be an example of an item management computer 210 of FIG. 2, and the data store 322 may be an example of one or more data stores 234 of FIG. 2.

In some examples, the projection equipped computing device 310 may measure or otherwise determine the distance between the projection equipped computing device 310 and the projection surface 312. The measured distance 314 may be any measurement of distance or measurement used to determine a distance, including meters, feet, inches, an absolute value, or Global Positioning System (GPS) coordinates between a first location and a second location. Various methods may be used to measure the distance between projection equipped computing device 310 and the projection surface 312. For example, the distance may be measured by triangulation, time of flight or pulse measurements, phase shift method, or an interferometer. In some examples, the measured distance 314 may be transmitted to the item management computer 320 and/or stored in the data store 322.

In some examples, the projection equipped computing device 310 may also identify an item of interest from the user, e.g., from a network page of an electronic marketplace that the user of the projection equipped computing device is currently browsing. Information regarding the identified item may be transmitted to the item management computer 320 and/or stored in the data store 322.

Figure 4:
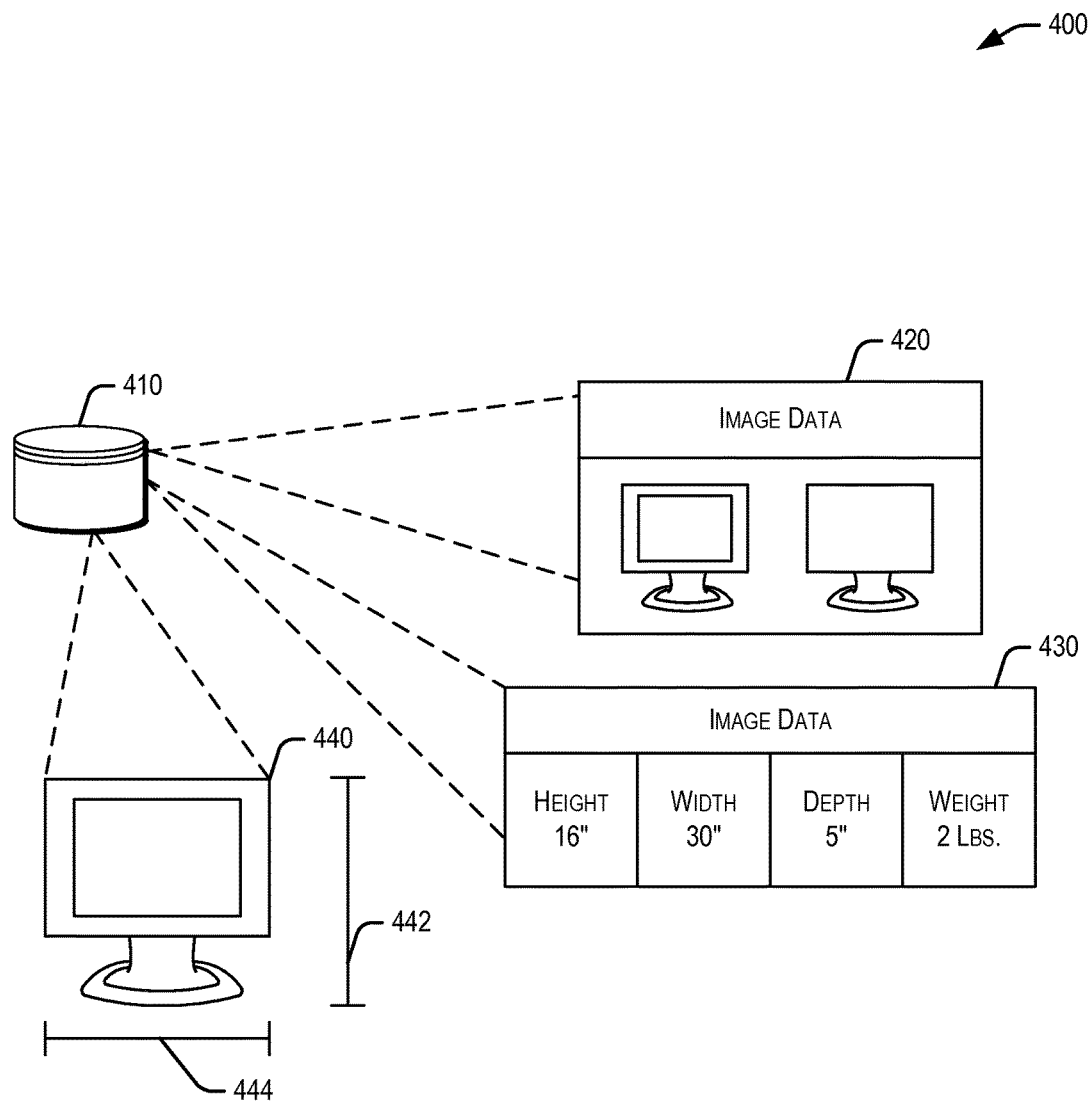
FIG. 4 is a block diagram illustrating an example of identifying image data or physical dimensions of an item available from an electronic marketplace for which representative dimensions will be projected onto a projection surface using the projection equipped computing device of FIG. 1.

FIG. 4 is a block diagram illustrating an example 400 of identifying image data or physical dimensions of an item available from an electronic marketplace for which representative dimensions will be projected onto a projection surface. The illustrated example 400 includes a data store 410 maintaining information about the item, e.g., a representation of the item, one or more images of the item, a unique identifier for the item, and/or other relevant information. In some examples, the data store 410 may be an example of one or more data stores 234 of FIG. 2 or a data store 322.

The data store 410 may receive an identification of an item, e.g., from the electronic marketplace, from a seller, etc. The identification of the item can include a unique item identifier, a description of the item, a manufacturer of the item, information from a network page associated with the item, or other information in order to help identify the item. In some examples, a user may choose the item from a network page generated by the electronic marketplace and associated with the item. The network page associated with the item may include an item identifier or other information that can be compared with records at the data store 410 to identify additional information about the item.

The identified item may correspond with image data. Various types of image data may be stored with the data store 410. For example, image data 420 may correspond with photographs, outlines, holograms, silhouettes, images, or other visual information about an item. The images associated with the image data 420 may be stored with the data store 410.

In some examples, some types of image data may correspond with physical dimensions of an item. The image data 430 may include the height (e.g., 16-inches), width (e.g., 30-inches), depth (e.g., 5-inches), weight (e.g., 2 pounds), or other measurements of physical dimensions of the item. In some examples, the physical dimensions of the item may be calculated from the image data 430, including using well-known mathematical formulas to determine a missing measurement (e.g., area=½ base*width). The physical dimensions may also correspond with measurements for a particular type of item (e.g., diagonal length for televisions having 65 inch displays, widescreen ratios including 16:9 or 4:3, etc.).

In some examples, the image data may calculate one or more physical dimensions of the item. For example, the image data 440 can include a height 442 and width 444 of an item. The dimensions of the item may be the substantially the same as height 442 and width 444.

In some examples, the image data may include one or more representative dimensions that correspond with the physical dimensions for the item. For example, the projection equipped computing device (not shown) can measure the distance between the projection surface and the projection equipped computing device and also identify the physical dimensions of the item. The representative dimensions of the item may be determined by the projection equipped computing device. The representative dimension of the representation of the item formed on the projection surface can mimic, at the determined distance, the physical dimension of the item identified from the image data 440 (e.g., including height 442 of an item, width 444 of an item, etc.).

Figure 5:
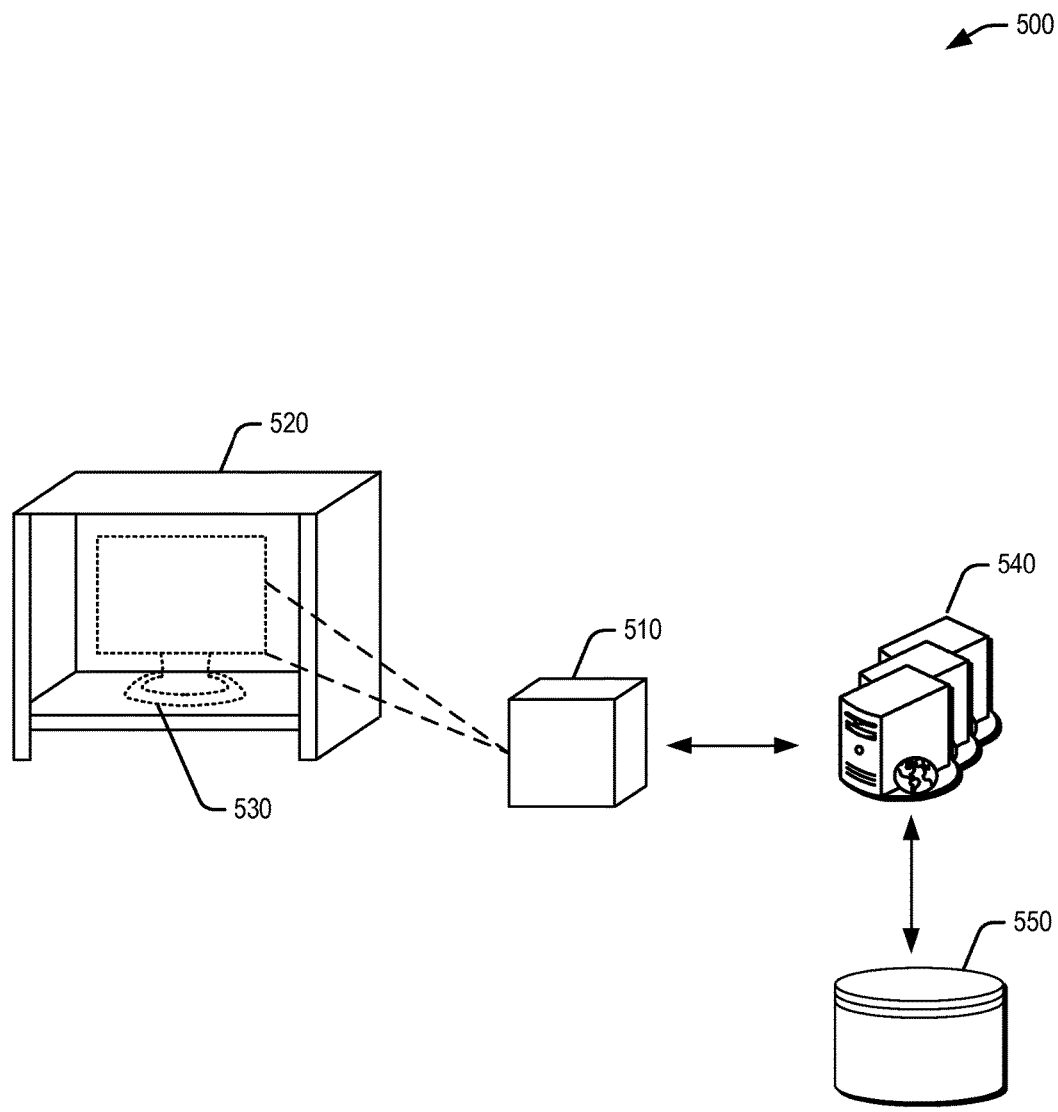
FIG. 5 is a pictorial diagram illustrating an example of forming a representation of the item for which representative dimensions will be projected onto a projection surface using the projection equipped computing device of FIG. 1.

FIG. 5 is a pictorial diagram illustrating an example 500 of forming a representation of the item for which representative dimensions will be projected onto a projection surface. The illustrated example 500 includes a projection equipped computing device 510, a projection surface 520, representation of an item 530, an item management computer 540, and data store 550. In some examples, the projection equipped computing device 510 may include or be in communication with a projection device such as that shown in FIG. 1, the item management computer 540 may be an example of an item management computer 210 of FIG. 2 or item management computer 320 of FIG. 3, and the data store 550 may be an example of one or more data stores 234 of FIG. 2 or the data store 322 of FIG. 3.

Figure 6:
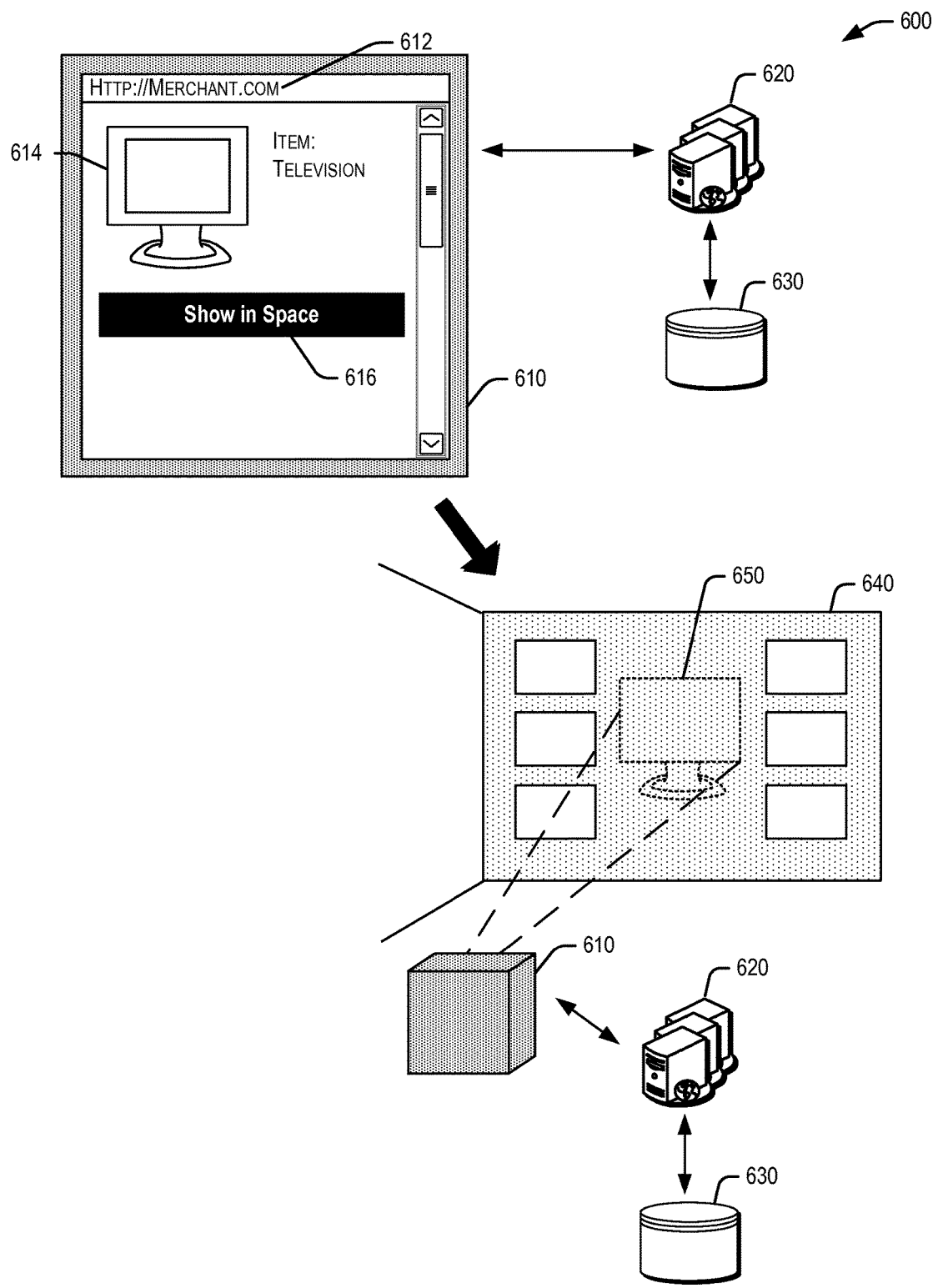
FIG. 6 is a pictorial diagram illustrating an example of the projection equipped computing device of FIG. 1 receiving image data for an item from an electronic marketplace.

In some examples, the projection equipped computing device 510 may project a light beam toward the projection surface 520 (e.g., a cabinet as illustrated in FIG. 4), based at least in part on the measured distance (e.g., illustrated in FIG. 3) between the projection equipped computing device and the projection surface. The projected light beam may form a representation of the item 530 on the projection surface 520. In some examples, the representation of the item 530 can be a three-dimensional representation of the item (as shown) or a two-dimensional representation of the item (e.g., as shown in FIG. 6). The representative dimensions of the representation of the item 530 on the projection surface 520 can mimic the physical dimensions of the item identified by the image data (e.g., illustrated in FIG. 4). For example, when the image data identifies the height of the television as 40-inches, the representation of the item 530 may also be 40-inches, regardless of where or how far the projection equipped computing device 510 is from the projection surface 520.

In some examples, the projection equipped computing device 510 may project the representation of the item on multiple projection surfaces. The representative dimension of the representation of the item formed on the projection surface can mimic the physical dimension of the item identified from the image data. For example, the projection equipped computing device 510 can point toward a narrow space under a cabinet. When the projection equipped computing device projects the representation of the item 530 to the back wall of the cabinet, the user can move the projection equipped computing device to an adjacent wall in the cabinet. The projection equipped computing device can project the profile of the item on the adjacent wall, using other measurements found in the image data (e.g., physical dimensions of height and width of the item). For example, the projection equipped computing device 510 may project a silhouette having the height and width of the front surface of the item on the back wall of the cabinet, while projecting a silhouette having the height and depth of a side surface of the item on the adjacent wall of the cabinet. In another example, the user may direct the projection equipped computing device toward the upper surface of the cabinet, upon which the projection equipped computing device can project a representation of the base of the item (e.g., when the physical dimensions of the base are identified in the image data).

In some examples, the projection equipped computing device 510 may establish a pinned location at one projection surface in order to project the representation of the item on multiple projection surfaces. For example, the pinned location can identify a starting point for the projection (e.g., the back wall of the cabinet). When the pinned location is established, the projection equipped computing device 510 can project the representation of the item using the height and width of the physical dimensions of the item to create a representative dimensions of the item on a two-dimensional plane (e.g., on the back wall of the cabinet). When the projection equipped computing device 510 is directed to a different wall in the cabinet, different representative dimensions of the item can be used to project a representation of the item on the different wall (e.g., using the same or different representative dimensions). For example, when the projection equipped computing device 510 is directed toward the left-wall of the cabinet as the projection surface, the pinned location can remain the same and the representation of the item can be projected to the left-wall of the cabinet. Different representative dimensions of the representation of the item may be used to project the representation of the item on the left-wall, including the height and the depth. When projected at the base of the cabinet, the width and the depth dimensions may be used to project the representation of the item on a different two-dimensional plane. In some examples, the two-dimensional projections can mimic the three-dimensional nature of the actual item.

FIG. 6 is a pictorial diagram illustrating an example 600 of a projection equipped computing device 610 receiving image data for an item obtained from an electronic marketplace. The illustrated example 600 includes a representation of an item 650, a projection equipped computing device 610, an item management computer 620, and a data store 630. In some examples, the projection equipped computing device 610 may include or be in communication with a projection device such as that shown in FIG. 1, the item management computer 620 may be an example of an item management computer 210 of FIG. 2 or item management computer 320 of FIG. 3, and the data store 630 may be an example of one or more data stores 234 of FIG. 2 or the data store 322 of FIG. 3. In the illustrated example 600, the projection equipped computing device 610 may present a network page 612 describing an item 614 in which the user of the projection equipped computing device is interested. As illustrated, the network page 612 can include a description of the item, item identifier (e.g., "television," model number associated with the item, etc.), image of the item, or other information. The network page 612 can also include a tool 616 (e.g., a graphical button titled "Show in Space") that enables the user to project a representation of the item in a space using the projection equipped computing device 610. The space may correspond with a projection surface identified by the user.

In some examples, the user may point the projection equipped computing device 610 at a projection surface 640, so that the projection equipped computing device 610 can measure the distance between the projection equipped computing device and the projection surface (e.g., after activating tool 616, etc.). In some examples, the projection equipped computing device can automatically measure the distance between the projection equipped computing device 610 and the projection surface 640 (e.g., using a distance sensor, an actuator/light receiver, without activating tool 616, etc.). In some examples, the projection equipped computing device 610 and/or the network page 612 presented on the projection equipped computing device may provide additional tools for the user to help measure the distance (e.g., a notification to the user to point the projection equipped computing device at the surface, a second tool/ button that allows the projection equipped computing device to start measuring, etc.).

Information may be transmitted to the item management computer 620 and/or data store 630. The item management computer 620 can identify the item, image data, or other information for the item identified by the projection equipped computing device 610. The image data may be provided to the projection equipped computing device 610, so that the projection equipped computing device 610 can identify the image data.

Based in part on the measured distance and/or image data, the projection equipped computing device 610 can project a light beam toward the projection surface 640. As illustrated, the projection surface 640 is a wall, but may include any location. A representation of the item 650 having representative dimensions can be projected on the wall as a light beam in order to mimic the physical dimensions of the item identified by the image data.

Figure 7:
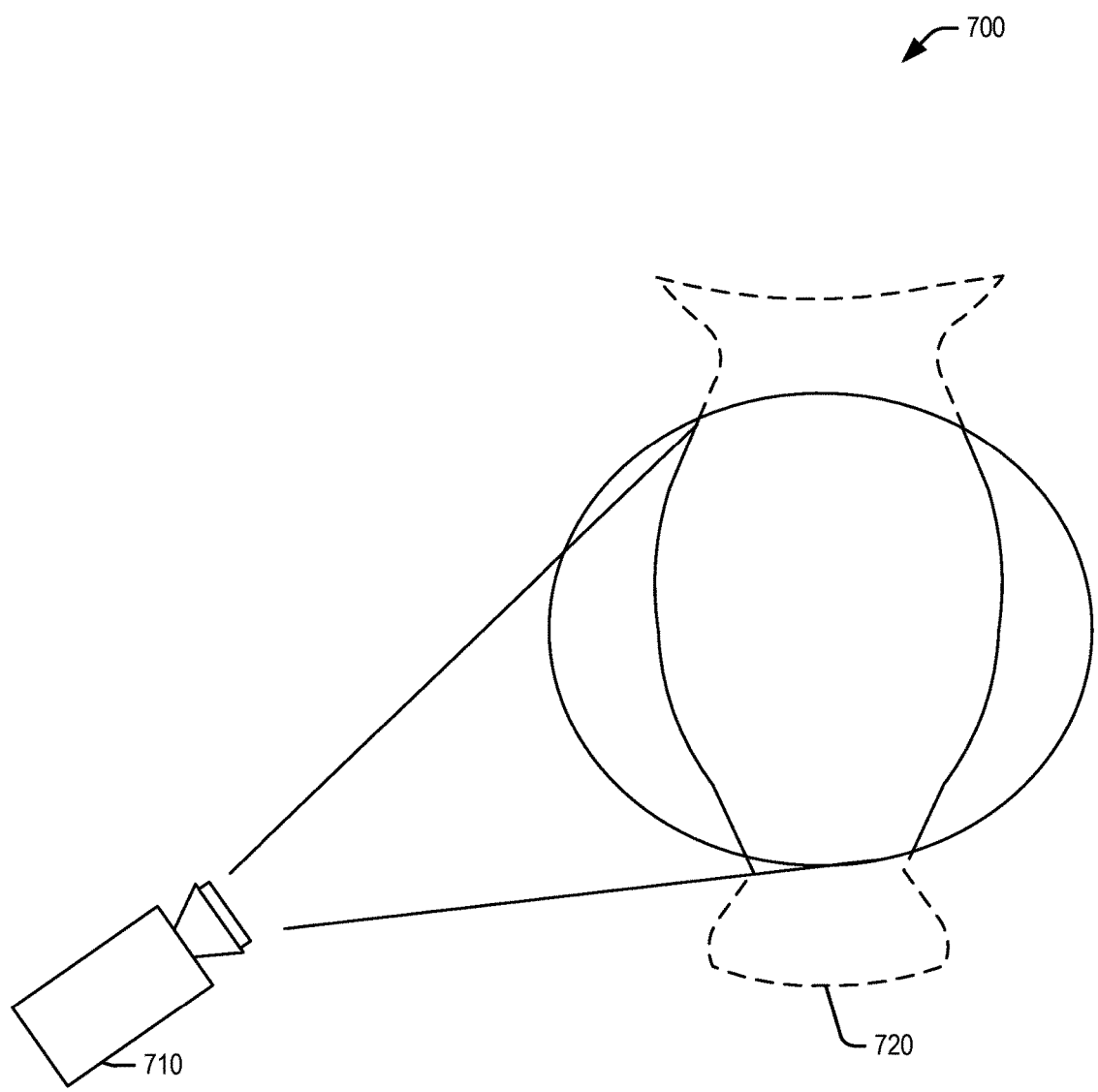
FIG. 7 is a pictorial diagram illustrating an example of a projection of a representation of an item available from the electronic marketplace on a projection surface.
Figure 8:
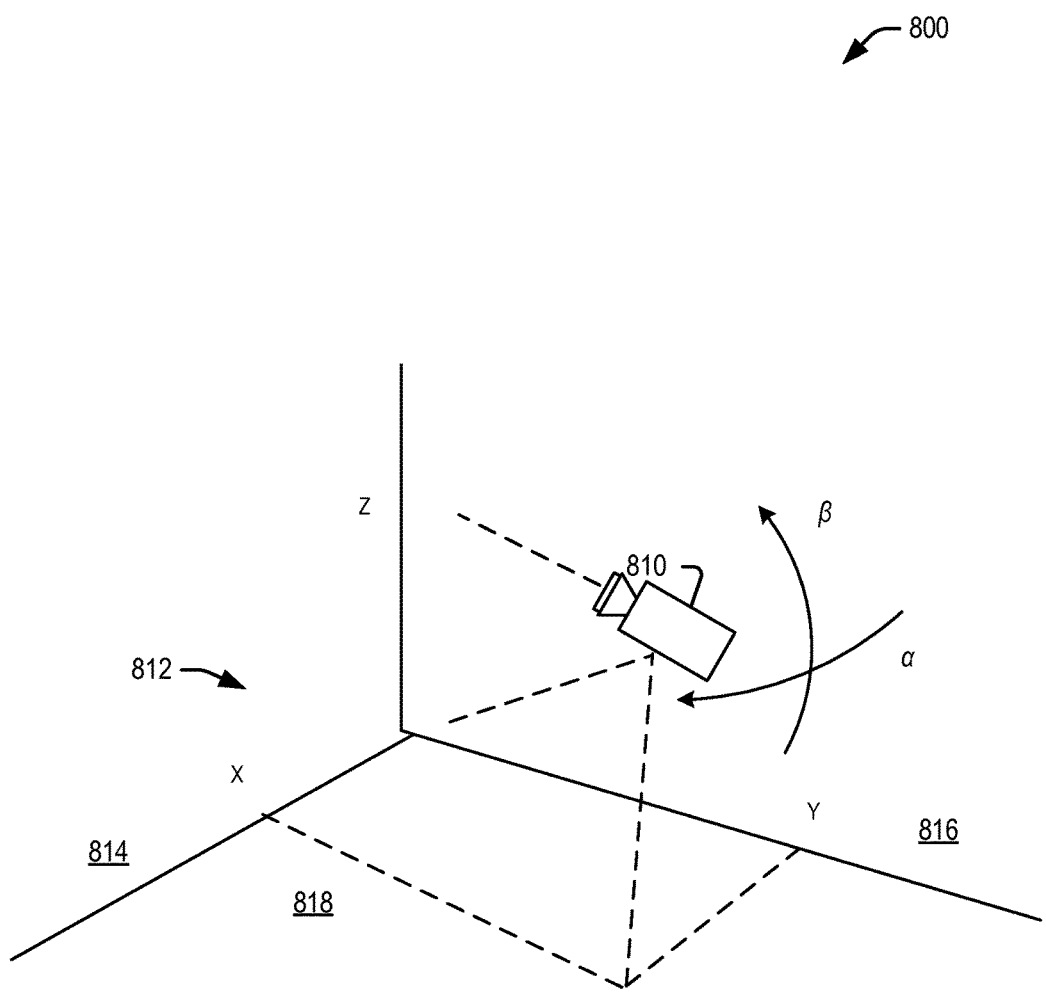
FIG. 8 is a pictorial diagram illustrating an example of the projection equipped computing device FIG. 1 determining its position in a space defined by a projection surface.
Figure 9:
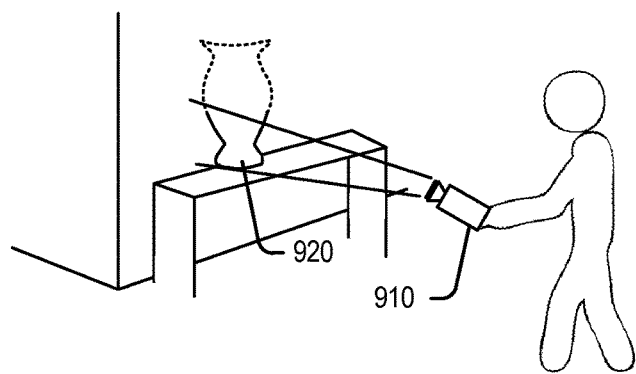
FIG. 9 is a pictorial diagram illustrating another example projection surface onto which a representation of an item available from an electronic marketplace is projected.
Figure 9:
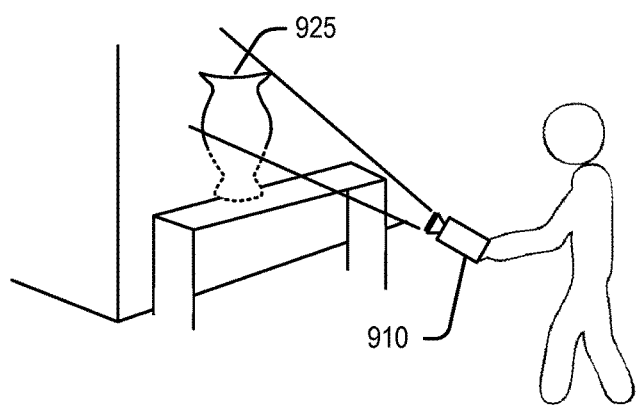

FIGS. 7-9 illustrate an example projection equipped computing device that is physically limited to a projection surface, without causing the user to move the projection equipped computing device at different angles. In some examples, the projection equipped computing device illustrated in these figures may be an example of that shown in FIG. 1 or FIG. 3.

FIG. 7 is a pictorial diagram illustrating an example 700 of a projection of a representation of an item available from the electronic marketplace on a projection surface. The example 700 includes a projection equipped computing device 710 projecting a representation of an item 720 on a projection surface. As illustrated, the projection equipped computing device 710 may be physically limited to a particular projection area (e.g., without moving the projection equipped computing device 710 to different angles in order to generate the complete representation of the item).

FIG. 8 is a pictorial diagram illustrating an example 800 of a projection equipped computing device 810 determining its position in a space defined by a projection surface, which position can be used to determine the appropriate projection of the representation of the item on the projection surface. The example 800 includes the projection equipped computing device 810 located at a position (e.g., in x-y-z planes, at β, α angles using a gyroscope or other methods known in the art, etc.) in a space 812 defined by walls 814 and 816, and a floor 818. In the illustrated example, the projection equipped computing device 810 can measure a distance between the projection equipped computing device 810 and a projection surface (e.g., including the walls 814 and 816, and/or the floor 818), including 2-feet from the wall 814 on the x-plane, 1-foot from the wall 816 on the y-plane, and 4-feet from the floor 818 on the z-plane.

In some examples, the projection equipped computing device 810 can determine its position through other methods that are not illustrated in FIG. 8. For example, the position of the projection equipped computing device 810 can be tracked in space through fusion sensing from an accelerometer. A gyroscope can be used with the accelerometer to determine three-dimensional (3D) calculations. In some examples, multiple distance sensors can be used (e.g., sonar sensor, light sensor, depth or distance sensor, etc.). Still another example can include low-energy radio-triangulation.

FIG. 9 is a pictorial diagram illustrating another example 900 projection surface onto which a representation of an item available from an electronic marketplace can be projected. The example 900 includes a projection equipped computing device 910 projecting a representation of an item 920 at a first time, and a representation of the item 925 at a second time. The position of the projection equipped computing device 910 may be established (e.g., as illustrated in FIG. 8). In some examples, once a position of the projection equipped computing device 910 is established and locked, the projection of the representation of the item by the projection equipped computing device 910 may be similar to a flashlight metaphor to illuminate longer items or scenes. The projection equipped computing device 910 may project the portion of the representation of the item at the first time and project another portion of the representation of the item at the second time. The representations of the item at the first and second time may form a complete representation of the item.

Figure 10:
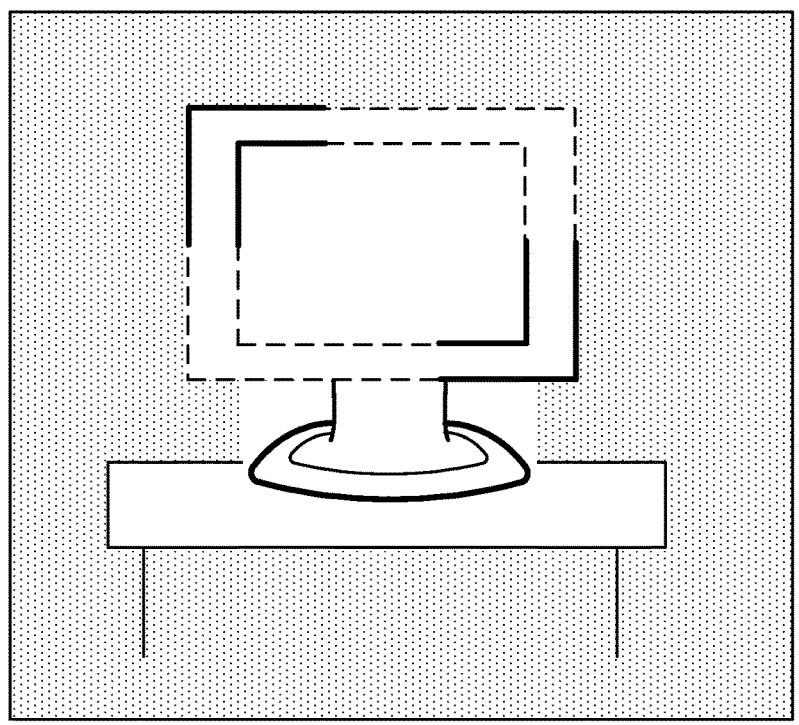
FIG. 10 is a pictorial diagram illustrating an example of an outline of an item with edges detected from image data in accordance with one embodiment.

FIG. 10 is a pictorial diagram illustrating an example 1000 of an outline of an item wherein the edges of the item that form the outline are detected from image data in accordance with an embodiment. In the example 1000, generating image data is illustrated. In some examples, the projection equipped computing device, item management computer or another device may receive an image of the item (e.g., a photograph) in which the user is interested and execute a process, such as an edge detection algorithm as is known in the art, to identify one or more edges of the item visible in the image. The distance between the edges of the item can then be identified as the distance between the edges in the representation of the item. In some examples, this information is transmitted to a projection equipped computing device and/or stored in a data store for future use as the representation and representative dimensions of the item.

In some examples, a representation of an item may be projected by two or more projection equipped computing devices. The two projection equipped computing devices can include individual implementations for providing the same representation of the item at the projection surface. For example, at a particular time, one of the projection equipped computing devices can project a representation of a first surface of an item and the other projection equipped computing device can project a representation of a second surface of the item. In some examples, the use of multiple projection equipped computing devices to project the representation(s) of the item upon the projection surface can help provide a representation of a larger item.

Figure 11:
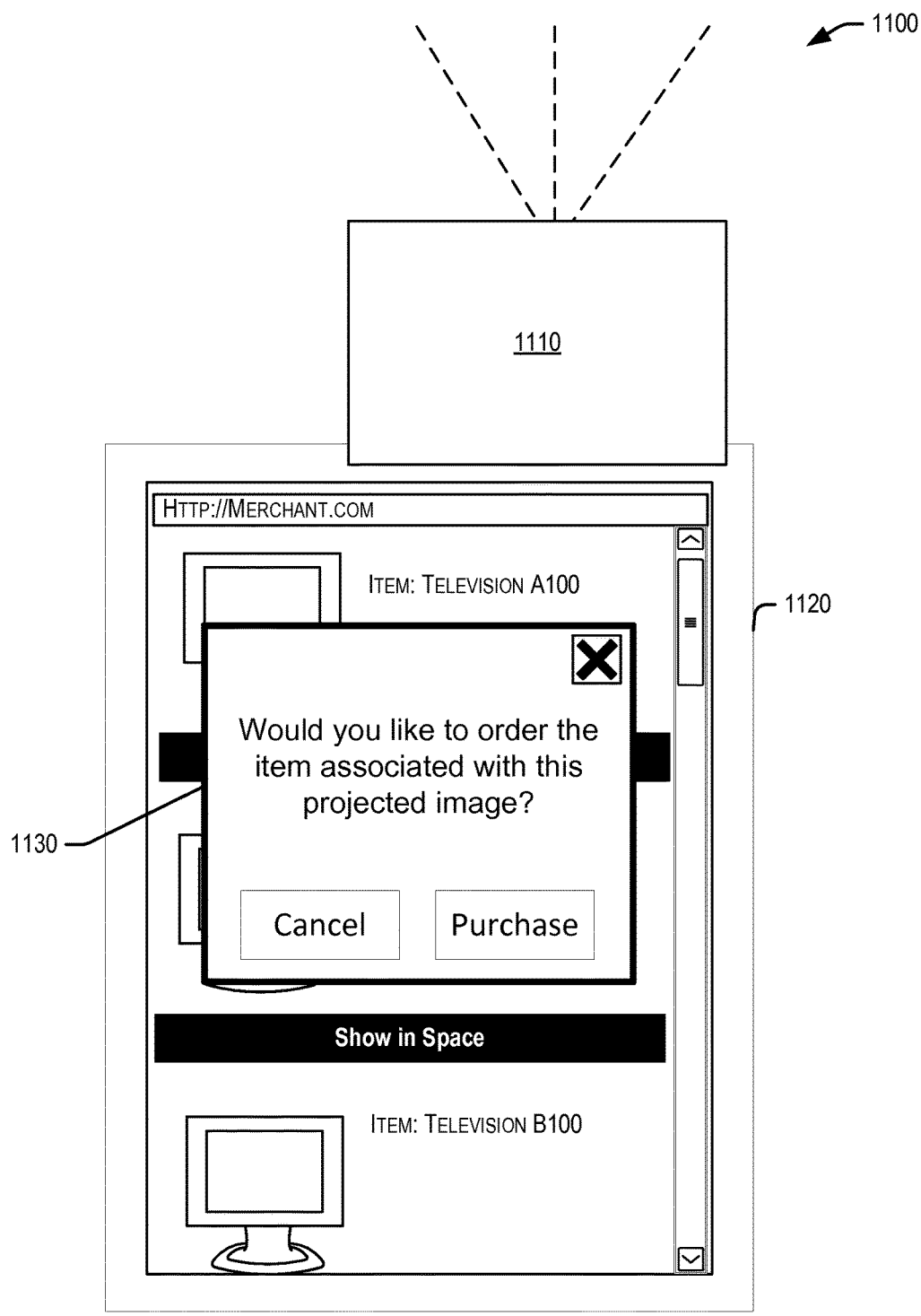
FIG. 11 is a pictorial diagram illustrating an example notification that may be presented to a user of the projection equipped computing device of FIG. 1.

FIG. 11 is a pictorial diagram illustrating an example notification 1130 that may be presented to a user of the projection equipped computing device 1100 either on a display of the projection equipped computing device 1100 (as illustrated) or projected onto the projection surface. For example, the notification 1130 can include information for the user associated with the projection of the representation of the item upon the projection surface (e.g., "Congratulations! Your item was projected on the projection surface."). In some examples, the notification 1130 may include information about the item itself (e.g., "We found a merchant that sells this item" or "This item is on clearance."). In some examples, the notification 1130 can include information about ordering the item from a seller or the electronic marketplace and/or identify the item as available to order from a seller or the electronic marketplace (e.g., "Would you like to order the item associated with this projected image?"). Those skilled in the art will appreciate that the notification can be generated by the electronic marketplace and/or the item management computer and provided to the projection equipped computing device for presentation.

In other examples, the notification can be generated and presented by the projection equipped computing device itself. For example, the projection device 1110 of the projection equipped computing device 1100 may analyze the light beam and incorporate the analysis with the notification. For example, the analysis of the light beam may determine if the representation of the item fits at the projection surface. The representation of the item may fit when the image is not distorted by an intervening item at the projection surface (e.g., the representation of the item is against a wall and a vase is also against a wall), the representation substantially interfaces with the projection surface (e.g., the representation of the item is able to fully hang on the wall without hanging off an edge of the wall), or other metrics. In some examples, when the projection device 1110 and/or user computing device 1120 of the projection equipped computing device 1100 identify a constraining surface, the "fit" test fails, otherwise it succeeds.

In some examples, the notification may also or alternatively include information as to whether the item fits in the desired space (e.g., "Congratulations! You selected an item that will fit in the space associated with the projection surface."). In some examples, the notification 1130 may be generated after an analysis of the light beam is complete.

Other types of notifications are available as well. In some examples, the notification may include some analysis regarding the distance or measurements associated with the projection surface (e.g., "you are within 2-inches of fitting this television in this space").

In some examples, the notification 1130 may include a recommendation. For example, a 60-inch television may be identified as an available option because the available amount of space at the projection surface is 90-inches. The notification may include information regarding one or more televisions that can fit in that space (e.g., based in part on dimensional profiles or image data stored with the data store, or items available through an electronic marketplace, etc.). In some examples, the recommendation can consider rules or criteria (e.g., identified by the user or dimensional analysis), other recommendations or feedback (e.g., other users claim that a 60-inch television is too big for a 90-inch space), budget, or other restrictions.

In some examples, the notification 1130 may also or alternatively provide an option to purchase the item (e.g., when the item fits in the space associated with the projection surface) from the electronic marketplace. The user may select the "purchase" tool (e.g., illustrated as a button on a graphical user interface (GUI)) and the projection equipped computing device 1100 can contact the electronic marketplace with the item to initiate an order of the item. In some examples, the projection equipped computing device 1100 may direct the user to merchant that offers the item for purchase or other acquisition.

Figure 12:
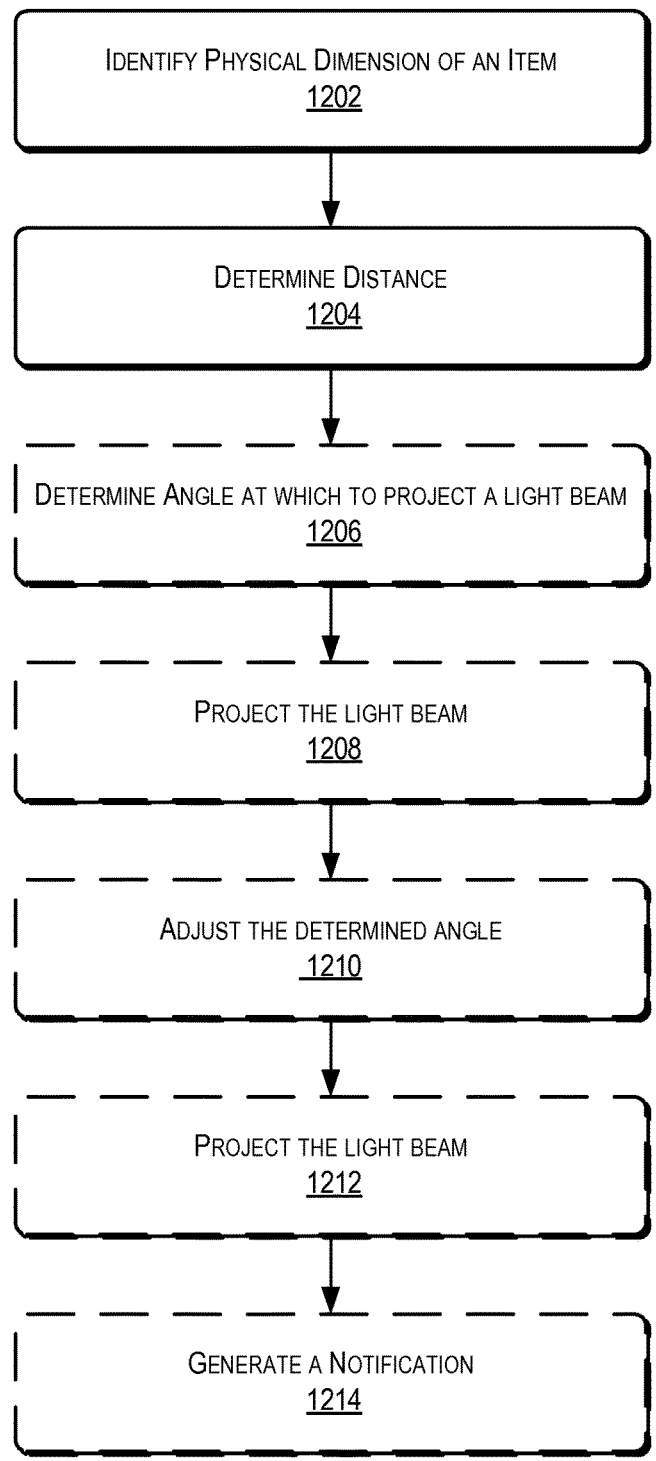
FIG. 12 is a flow diagram illustrating an example process for projecting a representation of an item onto a projection surface using the projection equipped computing device of FIG. 1.

FIG. 12 is a flow diagram illustrating an example process for projecting representation of an item onto a projection surface. In some examples, the one or more item management computers 210 (e.g., utilizing at least one of the item module 236, the image processing module 238, the projection module 240, and/or the electronic marketplace module 242) or one or more projection equipped computing devices 204 shown in FIG. 2 may perform the process 1200 of FIG. 12. The process 1200 may begin at 1202 by identifying the physical dimensions of an item. For example, the physical dimensions of the item may be identified from image data. In some examples, the physical dimensions of the item are identified by scanning the item and/or image of the item to identify the physical dimensions of the item.

At 1204, the process 1200 may include measuring or otherwise determining a distance of the projection equipped computing device from the projection surface. In some examples, the distance can be identified by a distance sensor and/or a depth sensor, distal sensing, triangulation, time of flight or pulse measurements, phase shift method, an interferometer, or other method of measuring distance known in the art.

At 1206, the process 1200 may optionally include determining an angle at which the projection equipped computing device is to project a light beam in order to form the representation of the item on the projection surface. For example, the angle may be the angle at which the light beam is projected toward the projection surface. In some examples, the angle may direct the light beam toward a mirror, where the mirror directs the beam toward the projection surface. In some examples, the angle maybe associated with the direction of the mirror (e.g., tilt the mirror to 0-degrees to create a representation of the item having particular representative dimensions).

At 1208, the process 1200 may optionally include instructing the projection equipped computing device to project the light beam onto the projection surface so as to form the representation of the item with representative dimensions that mimic the physical dimensions of the item identified by the image data. The representative dimensions may be based at least in part on the determined distance. In some examples, the light beam may be projected toward a mirror associated with the projection equipped computing device. The mirror may be operable to direct the light beam toward the projection surface at a determined angle. In some examples, the light beam may be projected at a first time.

At 1210, the process 1200 may optionally include adjusting the determined angle of the mirror. For example, the determined angle of the mirror may be adjusted based in part on the distance from the projection equipped computing device to the projection surface. In some examples, the light beam may be directed at an adjusted angle to help form the representation of the item at the projection surface (e.g., where the representation of the item includes representative dimensions).

At 1212, the process 1200 may optionally include instructing the projection equipped computing device to project the light beam onto the projection surface at a second time. For example, the light beam may be projected toward the mirror associated with the projection equipped computing device at a second time to direct the light beam toward the projection surface. In some examples, the projected light beam maybe projected at the first time and the second time (and so on) in order to form a pulse-based (e.g., light provided in an on/off succession) or continuous projection of the representation of the item at the projection surface. In some examples, the pulse-based projection of light may be projected at multiple times, including at the first time and the second time. In some examples, the first time and second time may be milliseconds apart, and may appear to the human eye to form a continuous projection.

Further in some examples, the process 1200 may optionally end at 1214, where the process 1200 may include generating a notification. For example, the generated notification can include a message that the item will fit in a space associated with the projection surface. In another example, the notification can identify that the item as available to order from a seller or electronic marketplace.

Figure 13:
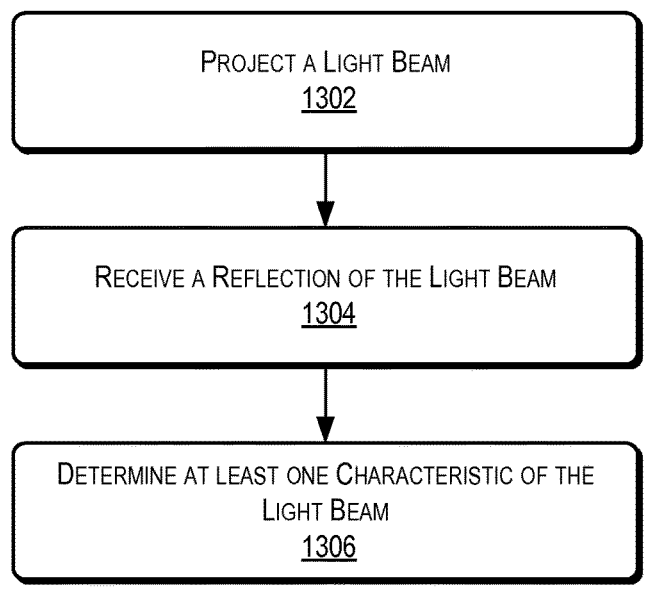
FIG. 13 is a flow diagram illustrating another example process for projecting a representation of an item onto a projection surface using the projection equipped computing device of FIG. 1.

FIG. 13 is a flow diagram illustrating another example process for projecting a representation of an item onto a projection surface. In some examples, the one or more item management computers 210 (e.g., utilizing at least one of the item module 236, the image processing module 238, the projection module 240, and/or the electronic marketplace module 242) or one or more projection equipped computing devices 204 shown in FIG. 2 may perform the process 1300 of FIG. 13. The process 1300 may be one example embodiment of 1204 shown in FIG. 12 and the embodiment of process 1300 can also include 1202, 1206, 1208, 1210, 1212, and/or 1214. The process 1300 may begin at 1302 by instructing the projection equipped computing device to project a light beam. For example, the light beam may be projected towards a projection surface. At 1304, the process 1300 may include receiving information regarding a reflection of the light beam. The reflection of the light beam can be received at the projection equipped computing device (e.g., by a light receiver illustrated in FIG. 1).

Next, at 1306, at least one characteristic of a light beam may be determined. As illustrated in FIG. 1, the light receiver 118 and/or processor 112 can determine the characteristic of the reflection and/or projection surface. For example, the characteristic may include the distance between the projection equipped computing device and projection surface. The distance between the projection equipped computing device and the projection surface may be the physical distance between the computing device projecting the representation of the item and the projection surface. However, as will be apparent to one of skill in the art, a suitable proxy may be used in place of an explicitly measured, physical distance, such as a reflected signal delay (e.g., delay between pulse generation and reflected pulse detection) and/or interferometry techniques. Accordingly, the term "measured distance" and/or "determined distance" may also reference such proxies. In another example, the characteristic may include a measuring plane or other information. After the characteristic is determined, the process may include 1206, 1208, 1210, 1212, and/or 1214 as illustrated in FIG. 12.

In some examples, the characteristic is the distance between the projection equipped computing device and the projection surface. For example, the time between projecting the light beam and receiving the light beam may be analyzed to determine the distance. In some examples, a light receiver and/or distance sensor helps to determine the characteristic (e.g., distance).

In some examples, the characteristic may help determine an angle to project the representation of the item to the projection surface. For example, the characteristic may determine that the projection surface is 45-degrees above the projection equipped computing device. Thus, the representative dimensions can be adjusted (e.g., to ensure that a projected "box" may appear as a "box" rather than a "trapezoid"). In some examples, keystone correction may calculate the adjustments in the representative dimensions so that the projected image looks like the appropriate shape (e.g., the box). The characteristic may also or alternatively include a distance sensor and/or a depth sensor, in part to evaluate the projection surface and warp the representation of the item to project correctly on the projection surface, e.g., when the projection surface is not flat, but rather is curved or angled.

Figure 14:
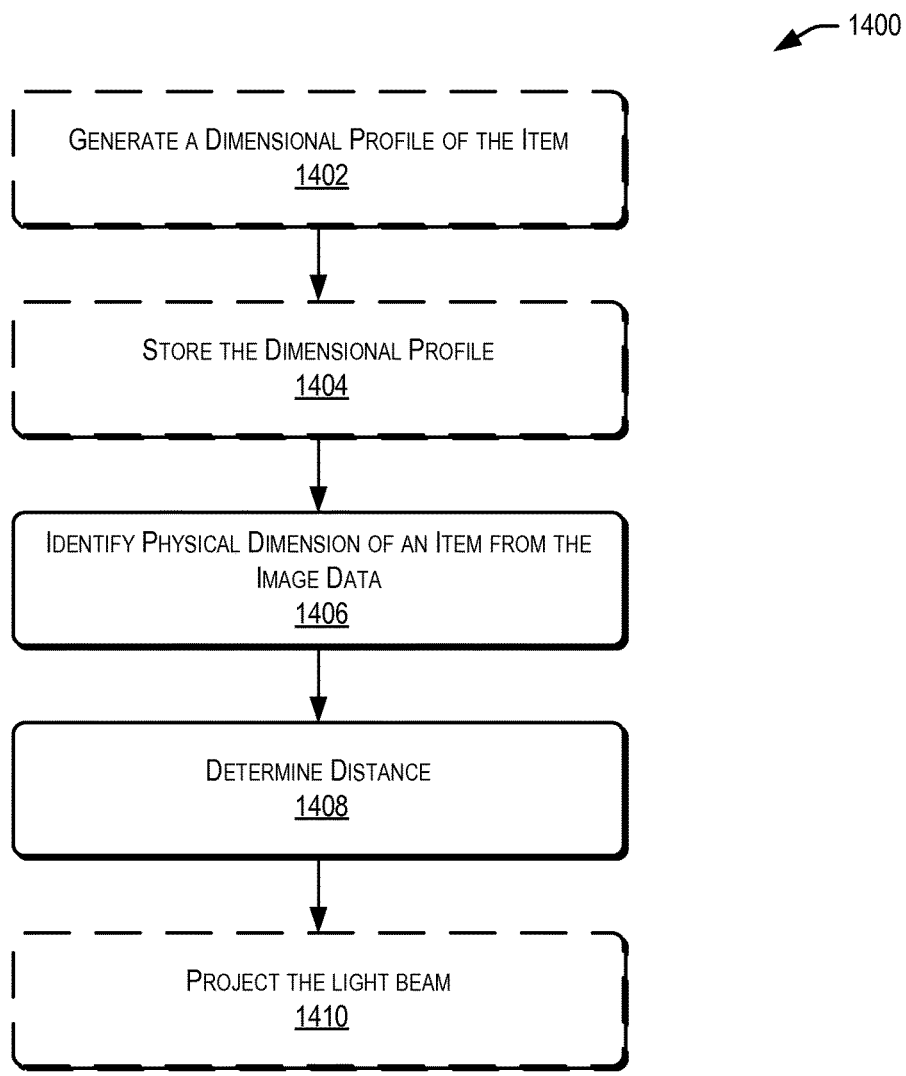
FIG. 14 is a flow diagram illustrating another example process for projecting a representation of an item onto a projection surface using the projection equipped computing device of FIG. 1.

FIG. 14 is a flow diagram illustrating another example process for projecting a representation of an item onto a projection surface. In some examples, the one or more item management computers 210 (e.g., utilizing at least one of the item module 236, the image processing module 238, the projection module 240, and/or the electronic marketplace module 242) or one or more projection equipped computing devices 204 shown in FIG. 2 may perform the process 1400 of FIG. 14. The process 1400 may optionally begin at 1402 by generating a dimensional profile of an item. For example, the dimensional profile of the item can include physical or representative dimension information about an item. For example, image data may identify that a model A100 television by Acme Co. is 3-feet tall by 5-feet wide, with a stand that is 1-foot tall by 1-foot wide. The dimensional profile may include each of these physical dimensions.

At 1404, the process 1400 may optionally include storing the dimensional profile. For example, the dimensional profile can be stored for future use within an electronic data store, including dimensions of an item to create a two-dimensional representation of the item (e.g., just the height and width) or a three-dimensional representation of item (e.g., depth, height, and width, or measurements in various planes, etc.). In some examples, a dimensional profile converts the physical dimensions to representative dimensions (e.g., using a 1-to-1 ratio, by calculating the representative dimensions for a particular surface from the physical dimensions, etc.).

At 1406, the process 1400 may include identifying physical dimensions of an item from the image data. At 1408, the process 1400 may include determining the distance. Further in some examples, the process 1400 may end at 1410, where the process 1400 may optionally include projecting the light beam. For example, the light beam may be projected toward the projection surface to help form a representation of the item on the projection surface, based at least in part on the determined distance. The representation of the item on the projection surface can mimic the dimensions of the item identified by the image data. In some examples, 1406, 1408, and 1410 may be examples of 1202, 1204, and 1208 of FIG. 12, respectively.

Figure 15:
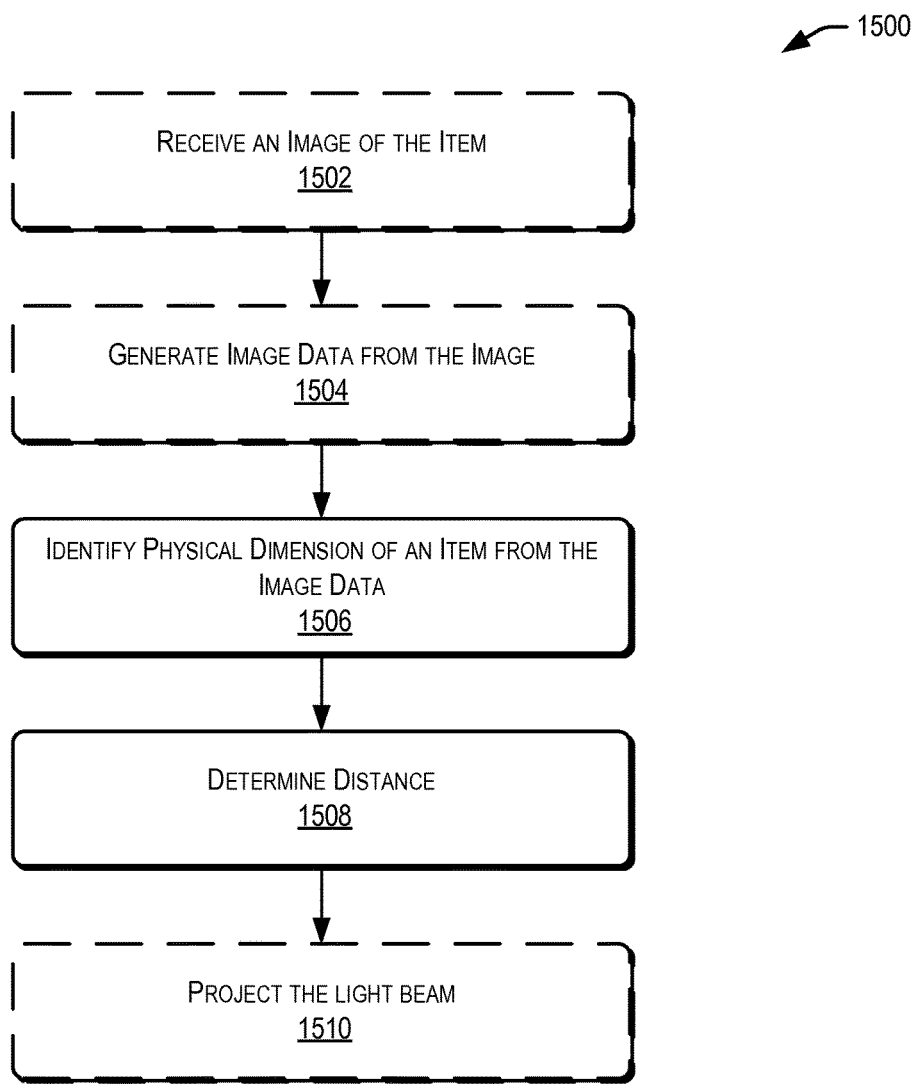
FIG. 15 is a flow diagram illustrating yet another example process for projecting a representation of an item onto a projection surface using the projection equipped computing device of FIG. 1.

FIG. 15 is a flow diagram illustrating yet another example process for projecting a representation of an item onto a projection surface. In some examples, the one or more item management computers 210 (e.g., utilizing at least one of the item module 236, the image processing module 238, the projection module 240, and/or the electronic marketplace module 242) or one or more projection equipped computing devices 204 shown in FIG. 2 may perform the process 1500 of FIG. 15. The process 1500 may optionally begin at 1502 by receiving an image of an item. The image may correspond with one or more images of the items (e.g., a photograph that shows the left-side of the item, the right-side of the item, etc.).

At 1504, the process 1500 may optionally include generating image data from the image. For example, a process (e.g., edge detection process, image recognition process, etc.) may recognize aspects of the image to identify characteristics of the item, including physical dimensions of the item. The physical dimensions of the item (e.g., from the image) may be used to generate the image data and/or the representative dimensions of the item that are used to mimic the physical dimensions of the item.

At 1506, the process 1500 may include identifying physical dimensions of an item from the image data. At 1508, the process 1500 may include determining the distance. Further in some examples, the process 1500 may end at 1510, where the process 1500 may optionally include projecting the light beam. For example, the light beam may be projected toward the projection surface to help form a representation of the item on the projection surface, based at least in part on the determined distance. The representation of the item on the projection surface can mimic the dimensions of the item identified by the image data. In some examples, 1506, 1508, and 1510 may be examples of 1202, 1204, and 1208 of FIG. 12, respectively.

Figure 16:
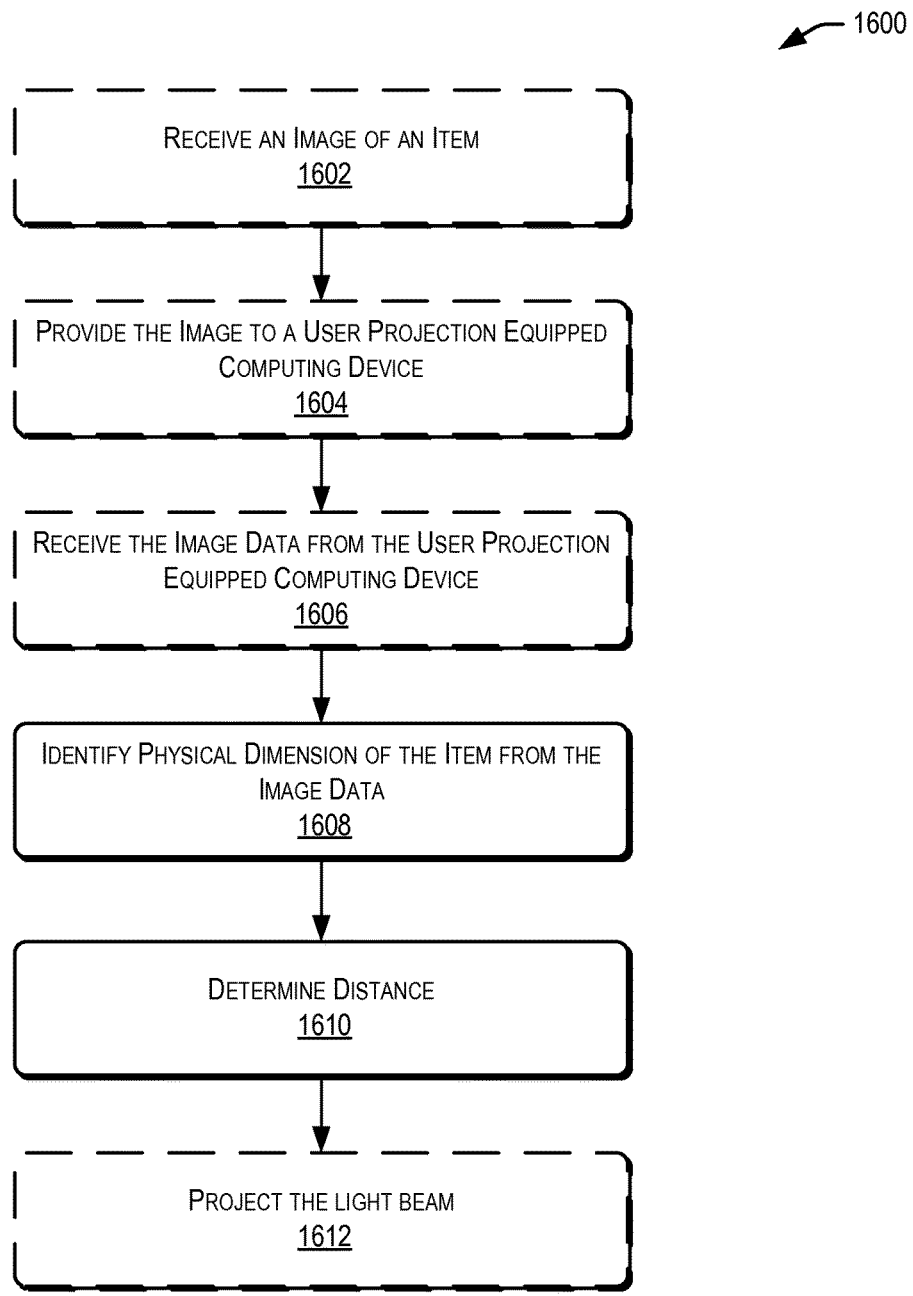
FIG. 16 is a flow diagram illustrating yet another example process for projecting a representation of an item onto a projection surface using the projection equipped computing device of FIG. 1.

FIG. 16 is a flow diagram illustrating yet another example process for projecting a representation of an item onto a projection surface. In some examples, the one or more item management computers 210 (e.g., utilizing at least one of the item module 236, the image processing module 238, the projection module 240, and/or the electronic marketplace module 242) or one or more projection equipped computing devices 204 shown in FIG. 2 may perform the process 1600 of FIG. 16. The process 1600 may optionally begin at 1602 by receiving an image of an item. For example, the image of the item may be a photograph, silhouette, outline, two-dimensional representation, three-dimensional representation, or other image.

At 1604, the process 1600 may optionally include providing the image to a user projection equipped computing device. For example, the user projection equipped computing device can utilize image recognition to process the image and generate the image data (e.g., physical dimensions, representative dimensions, absolute values of the edges of a representation of an item around a center point, features of the item relative to other features including the distance between two corners of a television screen or the physical dimension between a head and a shoulder of a stuffed animal, etc.). In some examples, the user projection equipped computing device may be similar to the projection equipped computing device illustrated of FIGS. 1 and 2 or the item management computer of FIG. 2. The projection equipped computing device may also be used to access an electronic marketplace and/or process image data. At 1606, the process 1600 may optionally include receiving the image data from the user projection equipped computing device (e.g., at the projection equipped computing device).

At 1608, the process 1600 may include identifying the physical dimensions of the item from the image data. At 1610, the process 1600 may include determining the distance. Further in some examples, the process 1600 may optionally end at 1612, where the process 1600 may include projecting the light beam. For example, the light beam may be projected toward the projection surface to help form a representation of the item on the projection surface, based at least in part on the determined distance. The representation of the item on the projection surface can mimic the dimensions of the item identified by the image data. In some examples, 1608, 1610, and 1612 may be examples of 1202, 1204, and 1208 of FIG. 12, respectively.

Figure 17:
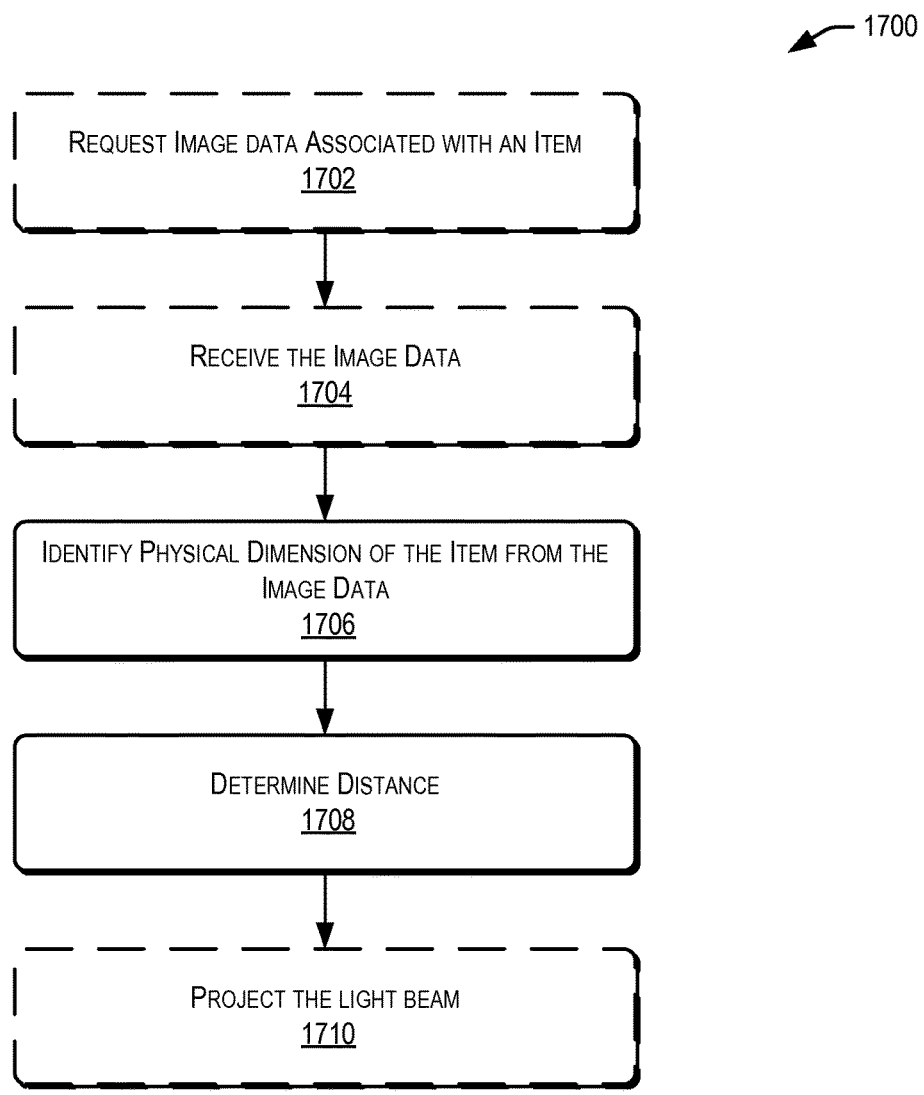
FIG. 17 is a flow diagram illustrating yet another example process for projecting a representation of an item onto a projection surface using the projection equipped computing device of FIG. 1.

FIG. 17 is a flow diagram illustrating yet another example process for projecting a representation of an item onto a projection surface. In some examples, the one or more item management computers 210 (e.g., utilizing at least one of the item module 236, the image processing module 238, the projection module 240, and/or the electronic marketplace module 242) or one or more projection equipped computing devices 204 shown in FIG. 2 may perform the process 1700 of FIG. 17. The process 1700 may optionally begin at 1702 by requesting image data associated with an item. For example, the image data may be requested from a network page associated with the item. The network page can be provided through an electronic marketplace.

At 1704, the process 1700 may optionally include receiving image data at the projection equipped computing device. For example, a projection equipped computing device may transmit the image data associated with the network page to the projection equipped computing device. In examples, the projection equipped computing device may receive the image data directly from the network page and/or data store associated with the network page.

At 1706, the process 1700 may include identifying physical dimensions of an item from the image data. At 1708, the process 1700 may include determining the distance. Further in some examples, the process 1700 may optionally end at 1710, where the process 1700 may include projecting the light beam. For example, the light beam may be projected toward the projection surface to help form a representation of the item on the projection surface, based at least in part on the determined distance. The representation of the item on the projection surface can mimic the dimensions of the item identified by the image data. In some examples, 1706, 1708, and 1710 may be examples of 1202, 1204, and 1208 of FIG. 12, respectively.

Illustrative methods and systems for providing accurate, representative dimensions of an item at a projection surface are described above. Some or all of these systems and methods may, but need not, be implemented at least partially by architectures such as those shown at least in FIGS. 1-17 above.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding, with or without author input or prompting, whether these features, elements, and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The use of the terms "a," "an," "the," and similar references in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and/or at least one of Z in order for each to be present.

Illustrative embodiments of this disclosure are described herein, including the best mode known to the inventors for carrying out the disclosure. Variations of those embodiments may become apparent to those skilled in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An apparatus comprising:
    a computer-readable non-transitory storage medium configured to store specific computer-executable instructions;
    a light source configured to project a light beam toward a projection surface; and
    a processor in communication with the light source and the computer-readable non-transitory storage medium, the processor configured to execute the specific computer-executable instructions to at least:
        identify a physical dimension of an item from image data associated with the item;
        determine a distance between the apparatus and the projection surface;
        determine an angle at which the light beam is to be projected toward the projection surface; and
        based at least in part on the determined distance, cause the light source to project the light beam toward the projection surface to form a representation of the item on the projection surface,
        wherein the representation of the item has a representative dimension,
        wherein the representative dimension of the representation of the item formed on the projection surface automatically mimics, at the determined distance, the physical dimension of the item identified from the image data, and
        wherein the projection surface is a physical projection surface in a non-virtual environment and the angle is determined to mimic the physical dimension of the item at the physical projection surface.

2. The apparatus of claim 1, further comprising a light receiver, wherein the processor is configured to further execute the specific computer-executable instructions to at least:
    receive, by the light receiver, a reflection of the light beam;
    determine at least one characteristic of the reflection, wherein the at least one characteristic includes at least one of the distance between the apparatus and the projection surface, a measuring plane, or an angle to project the representation of the item to the projection surface; and
    adjust the light source that projects the light beam toward the projection surface to form the representation of the item on the projection surface, based in part on the at least one characteristic of the reflection.

3. The apparatus of claim 1, further comprising a mirror, wherein the processor is configured to further execute the specific computer-executable instructions to at least:
    cause the light source to project the light beam toward the mirror, wherein the mirror directs the light beam toward the projection surface at a determined angle.

4. The apparatus of claim 1, wherein the projection surface is unattached to the apparatus.

5. The apparatus of claim 1, wherein the projection surface is a body part of a user of the apparatus and the item is a wearable item.

6. A computer-implemented method comprising:
    identifying, by a computing device, physical dimensions of an item from image data associated with the item;
    determining, by the computing device, a distance between a projection device and a projection surface;
    determining an angle at which a light beam is to be projected toward the projection surface;
    causing the projection device to project the light beam, at a first time, toward a mirror associated with the projection device, wherein the mirror directs the light beam toward the projection surface at the angle;
    adjusting the angle at which the light beam is to be projected toward the projection surface, wherein the adjusting is based at least in part on the determined distance between the projection device and the projection surface, wherein the projection surface is a physical projection surface in a non-virtual environment and the angle is adjusted to mimic the physical dimensions of the item at the physical projection surface; and
    causing the projection device to project the light beam, at a second time, toward the mirror associated with the projection device, wherein the mirror directs the light beam toward the projection surface at the adjusted angle,
    wherein the projection of the light beam at the first time and the second time forms a representation of the item at the projection surface, and
    wherein representative dimensions of the representation of the item formed at the projection surface automatically mimic the physical dimensions of the item identified from the image data at the determined distance.

7. The computer-implemented method of claim 6, wherein the image data includes the physical dimensions of the item.

8. The computer-implemented method of claim 6, wherein the image data includes an image of the item, and the representation of the item is an outline of the item depicted in the image.

9. The computer-implemented method of claim 6, wherein the projection of the light beam is a pulse-based projection of the light beam at the first time and the second time.

10. The computer-implemented method of claim 6, wherein the representation of the item subtends an angle of the mirror, so that the angle of the mirror is larger when the projection device is closer to the projection surface.

11. The computer-implemented method of claim 6, wherein the mirror comprises a MicroElectroMechanical Systems (MEMS) mirror.

12. One or more computer-readable non-transitory storage media collectively storing computer-executable instructions that, when executed by one or more computer systems, configure the one or more computer systems to collectively perform operations comprising:
    identifying a physical dimension of an item from image data associated with the item;

determining an angle at which a light beam is to be projected toward a projection surface; and determining a distance between a projection device and the projection surface, the determining comprising:

based at least in part on the determined distance, causing the projection device to project the light beam toward the projection surface to form a representation of the item on the projection surface, wherein a representative dimension of the representation of the item on the projection surface automatically mimics, at the determined distance, the physical dimension of the item identified from the image data, and wherein the projection surface is a physical projection surface in a non-virtual environment and the angle is determined to mimic the physical dimension of the item at the physical projection surface.

13. The computer-readable non-transitory storage media of claim 12, wherein the light beam comprises a laser beam.

14. The computer-readable non-transitory storage media of claim 12, the operations further comprising:

generating a notification that identifies the item as available to order from a seller or electronic marketplace.

15. The computer-readable non-transitory storage media of claim 12, the operations further comprising:

generating a dimensional profile of the item, the dimensional profile including the physical dimension of the item identified from the image data; and storing the dimensional profile within an electronic data store.

16. The computer-readable non-transitory storage media of claim 12, the operations further comprising:

receiving an image of the item; and generating the image data from the image.

17. The computer-readable non-transitory storage media of claim 12, wherein the image data is generated utilizing an image recognition process.

18. The computer-readable non-transitory storage media of claim 12, the operations further comprising obtaining the image data from a network page associated with the item, the network page provided by an electronic marketplace.

19. The computer-readable non-transitory storage media of claim 12, wherein the image data is obtained responsive to a user selection of the item from a network page.

20. The computer-readable non-transitory storage media of claim 12, wherein the projection surface is an intermediary projection surface and the representation of the item is formed at a secondary projection surface.

21. The computer-readable non-transitory storage media of claim 12, the operations further comprising:

receiving a reflection of the light beam;

determining at least one characteristic of the reflection, wherein the at least one characteristic includes at least one of the determined distance between the projection device and the projection surface, a measuring plane, or an angle to project the representation of the item to the projection surface; and causing an adjustment to the projection device that projects the light beam toward the projection surface to form the representation of the item on the projection surface, based in part on the at least one characteristic of the reflection.

* * * * *